US011593513B2

(12) United States Patent
Domoto et al.

(10) Patent No.: US 11,593,513 B2
(45) Date of Patent: Feb. 28, 2023

(54) INFORMATION PROCESSING SYSTEM, DATA PROVISION SYSTEM, AND RELATED METHOD

(71) Applicant: Hakuhodo DY Holdings Inc., Tokyo (JP)

(72) Inventors: Ryo Domoto, Tokyo (JP); Ryoji Minami, Tokyo (JP)

(73) Assignee: Hakuhodo DY Holdings Inc., Tokyo (JP)

( * ) Notice: Subject to any disclaimer, the term of this patent is extended or adjusted under 35 U.S.C. 154(b) by 227 days.

(21) Appl. No.: 16/754,517

(22) PCT Filed: Oct. 9, 2018

(86) PCT No.: PCT/JP2018/037559
§ 371 (c)(1),
(2) Date: Apr. 8, 2020

(87) PCT Pub. No.: WO2019/073959
PCT Pub. Date: Apr. 18, 2019

(65) Prior Publication Data
US 2020/0394330 A1    Dec. 17, 2020

(30) Foreign Application Priority Data

Oct. 10, 2017  (JP) .............................. JP2017-197105
Mar. 27, 2018  (JP) .............................. JP2018-060006

(51) Int. Cl.
*G06F 21/62*        (2013.01)
*G06K 9/62*         (2022.01)
(Continued)

(52) U.S. Cl.
CPC ....... *G06F 21/6245* (2013.01); *G06K 9/6201* (2013.01); *G06K 9/6221* (2013.01);
(Continued)

(58) Field of Classification Search
None
See application file for complete search history.

(56) References Cited

U.S. PATENT DOCUMENTS 10,303,703 B2 *  5/2019  Meierhoefer ......... G06F 16/284
2002/0194050 A1 * 12/2002  Nabe ..................... G06Q 40/04
                                                        705/7.33
(Continued)

FOREIGN PATENT DOCUMENTS

CN    104412301 A  *  3/2015  ............... G06K 9/46
CN    104412310 A  *  3/2015  ............. G01C 21/10
(Continued)

OTHER PUBLICATIONS

International Search Report, issued in corresponding application No. PCT/JP2018/037559, dated Jan. 8, 2019, 4 pages.
(Continued)

*Primary Examiner* — Mohammed Rachedine
(74) *Attorney, Agent, or Firm* — Meunier Carlin & Curfman LLC

(57) ABSTRACT

A method according to an aspect of the present disclosure includes combining pieces of first feature data and pieces of second feature data. Each of the pieces of first feature data is associated with first identification information related to a corresponding one or more of first constituents included in a first group and indicates a feature of the corresponding one or more of the first constituents. Each of the pieces of the second feature data corresponds to one of clusters in the second group. The second feature data includes statistic data associated with second identification information related to two or more of the second constituents included in a corresponding cluster. The statistic data has a statistic indicating a feature of two or more of the second constituents included in the corresponding cluster. The combining is
(Continued)

performed based on the first identification information and the second identification information.

20 Claims, 41 Drawing Sheets

(51) Int. Cl.
  *G06F 16/28* (2019.01)
  *G06V 10/75* (2022.01)
  *G06Q 30/00* (2012.01)

(52) U.S. Cl.
  CPC ......... *G06K 9/6227* (2013.01); *G06K 9/6277* (2013.01); *G06V 10/759* (2022.01)

(56) References Cited

U.S. PATENT DOCUMENTS

| | | | |
|---|---|---|---|
| 2015/0304331 A1 | 10/2015 | Nakagawa et al. | |
| 2016/0048723 A1* | 2/2016 | Jeong | G06V 20/49 382/197 |
| 2016/0371274 A1* | 12/2016 | Ng | G06F 16/24573 |
| 2017/0270422 A1* | 9/2017 | Sorakado | G06Q 30/02 |

FOREIGN PATENT DOCUMENTS

| | | | | |
|---|---|---|---|---|
| CN | 104516938 A | * | 4/2015 | ............ G06Q 30/02 |
| CN | 106408332 A | * | 2/2017 | |
| CN | 105431828 A1 | * | 9/2019 | |
| CN | 105431828 B | * | 9/2019 | ............ G06N 20/00 |
| EP | 3070658 A1 | * | 9/2016 | ....... G06F 17/30528 |
| EP | 3196777 A1 | | 7/2017 | |
| EP | 3196777 A1 | * | 7/2017 | ............ G06F 16/00 |
| JP | 2014109647 A | | 6/2014 | |
| JP | 2014-241098 A | | 12/2014 | |
| JP | 2016-038780 A | | 3/2016 | |
| JP | 2016-126609 A | | 7/2016 | |
| JP | 2017-174403 A | | 9/2017 | |

OTHER PUBLICATIONS

Notice of Reason(s) for Rejection dated Dec. 25, 2018 in the corresponding Japanese Patent Application No. 2018-180220.
Extended European Search Report in the connection to EP Application No. 18865414.9, dated Apr. 8, 2021.
Communication pursuant to Article 94(3) EPC for European Application No. 18865414.9 dated Jul. 27, 2022.
Office Action issued in Indonesian Patent Application No. P00202003239, dated Dec. 26, 2022. English machine translation provided.

* cited by examiner

| ID CODE | X1 | X2 | X3 |
|---|---|---|---|
| ID001 | PE | PE | PE |
| ID002 | PE | PE | PE |
| ID003 | PE | PE | PE |
| ID004 | PE | PE | PE |
| ID005 | PE | PE | PE |
| ID006 | PE | PE | PE |
| ID007 | PE | PE | PE |
| ID008 | PE | PE | PE |
| ID009 | PE | PE | PE |
| ID010 | PE | PE | PE |
| ID011 | PE | PE | PE |
| ID012 | PE | PE | PE |
| ID013 | PE | PE | PE |
| ID014 | PE | PE | PE |

FIG. 2A

| ID CODE | Y1 | Y2 | Y3 |
|---|---|---|---|
| ID001 | PE | PE | PE |
| ID002 | PE | PE | PE |
| ID003 | PE | PE | PE |
| ID004 | PE | PE | PE |
| ID005 | PE | PE | PE |
| ID006 | PE | PE | PE |
| ID007 | PE | PE | PE |
| ID008 | PE | PE | PE |
| ID009 | PE | PE | PE |
| ID010 | PE | PE | PE |
| ID015 | PE | PE | PE |
| ID016 | PE | PE | PE |
| ID017 | PE | PE | PE |
| ID018 | PE | PE | PE |

FIG. 2B

| ID CODE | Y1 | Y2 | Y3 |
|---|---|---|---|
| ID001 | ST | ST | ST |
| ID002 |  |  |  |
| ID003 |  |  |  |
| ID004 | ST | ST | ST |
| ID005 |  |  |  |
| ID006 |  |  |  |
| ID007 |  |  |  |
| ID008 | ST | ST | ST |
| ID009 |  |  |  |
| ID010 |  |  |  |
| ID015 | ST | ST | ST |
| ID016 |  |  |  |
| ID017 | ST | ST | ST |
| ID018 |  |  |  |

FIG. 6

| ID CODE | X1 | X2 | X3 | Y1 | Y2 | Y3 |
|---|---|---|---|---|---|---|
| ID001 | PE | PE | PE | ST | ST | ST |
| ID002 | PE | PE | PE | | | |
| ID003 | PE | PE | PE | | | |
| ID004 | PE | PE | PE | ST | ST | ST |
| ID005 | PE | PE | PE | | | |
| ID006 | PE | PE | PE | | | |
| ID007 | PE | PE | PE | | | |
| ID008 | PE | PE | PE | ST | ST | ST |
| ID009 | PE | PE | PE | | | |
| ID010 | PE | PE | PE | | | |
| ID011 | PE | PE | PE | | | |
| ID012 | PE | PE | PE | | | |
| ID013 | PE | PE | PE | | | |
| ID014 | PE | PE | PE | | | |
| ID015 | | | | ST | ST | ST |
| ID016 | | | | | | |
| ID017 | | | | ST | ST | ST |
| ID018 | | | | | | |

FIG. 7

| ID CODE | Y1 | Y2 | Y3 |
|---|---|---|---|
| ID001 | ST | ST | ST |
| ID002 | ST | ST | ST |
| ID003 | ST | ST | ST |
| ... | ... | ... | ... |

FSI, FC2

FIG. 8A

| ID CODE | X1 | X2 | X3 | Y1 | Y2 | Y3 |
|---|---|---|---|---|---|---|
| ID001 | PE | PE | PE | ST | ST | ST |
| ID002 | PE | PE | PE | ST | ST | ST |
| ID003 | PE | PE | PE | ST | ST | ST |
| ... | ... | ... | ... | ... | ... | ... |

F1, FSI

FIG. 8B

| ID CODE | Z1 | Z2 | Z3 |
|---|---|---|---|
| ID005 | PE | PE | PE |
| ID006 | PE | PE | PE |
| ID007 | PE | PE | PE |
| ID008 | PE | PE | PE |
| ID009 | PE | PE | PE |
| ID010 | PE | PE | PE |
| ID011 | PE | PE | PE |
| ID012 | PE | PE | PE |
| ID013 | PE | PE | PE |
| ID014 | PE | PE | PE |
| ID015 | PE | PE | PE |
| ID016 | PE | PE | PE |
| ID017 | PE | PE | PE |
| ID018 | PE | PE | PE |

FIG. 10A

| ID CODE | Z1 | Z2 | Z3 |
|---|---|---|---|
| ID005 | ST | ST | ST |
| ID006 | ST | ST | ST |
| ID007 | ST | ST | ST |
| ID008 | ST | ST | ST |
| ID009 | ST | ST | ST |
| ID010 | ST | ST | ST |
| ID011 | ST | ST | ST |
| ID012 | ST | ST | ST |
| ID013 | ST | ST | ST |
| ID014 | ST | ST | ST |
| ID015 | ST | ST | ST |
| ID016 | ST | ST | ST |
| ID017 | ST | ST | ST |
| ID018 | ST | ST | ST |

FIG. 10B

| ID CODE | X1 | X2 | X3 | Y1 | Y2 | Y3 | Z1 | Z2 | Z3 |
|---|---|---|---|---|---|---|---|---|---|
| ID001 | PE | PE | PE | | | | | | |
| ID002 | PE | PE | PE | | | | | | |
| ID003 | PE | PE | PE | | | | | | |
| ID004 | PE | PE | PE | ST | ST | ST | | | |
| ID005 | PE | PE | PE | | | | | | |
| ID006 | PE | PE | PE | ST | ST | ST | | | |
| ID007 | PE | PE | PE | | | | | | |
| ID008 | PE | PE | PE | ST | ST | ST | | | |
| ID009 | PE | PE | PE | | | | | | |
| ID010 | PE | PE | PE | | | | ST | ST | ST |
| ID011 | PE | PE | PE | | | | ST | ST | ST |
| ID012 | PE | PE | PE | | | | ST | ST | ST |
| ID013 | PE | PE | PE | ST | ST | ST | ST | ST | ST |
| ID014 | PE | PE | PE | ST | ST | ST | ST | ST | ST |
| ID015 | | | | ST | ST | ST | ST | ST | ST |
| ID016 | | | | ST | ST | ST | ST | ST | ST |
| ID017 | | | | ST | ST | ST | ST | ST | ST |
| ID018 | | | | ST | ST | ST | ST | ST | ST |

FIG. 11

| ID CODE | Y1 | Y2 | Y3 |
|---|---|---|---|
| IDY101 | PE | PE | PE |
| IDY102 | PE | PE | PE |
| IDY103 | PE | PE | PE |
| IDY104 | PE | PE | PE |
| IDY105 | PE | PE | PE |
| IDY106 | PE | PE | PE |
| IDY107 | PE | PE | PE |
| IDY108 | PE | PE | PE |
| IDY109 | PE | PE | PE |
| IDY110 | PE | PE | PE |
| IDY111 | PE | PE | PE |
| IDY112 | PE | PE | PE |
| IDY113 | PE | PE | PE |
| IDY114 | PE | PE | PE |

FIG. 12A

| ID CODE | Y1 | Y2 | Y3 |
|---|---|---|---|
| IDY101 | | | |
| IDY102 | ST | ST | ST |
| IDY103 | | | |
| IDY104 | | | |
| IDY105 | ST | ST | ST |
| IDY106 | | | |
| IDY107 | | | |
| IDY108 | ST | ST | ST |
| IDY109 | | | |
| IDY110 | | | |

FIG. 12B

| ID CODE | ID CODE | TB1 |
|---------|---------|-----|
| ID001 | IDY101 | |
| ID002 | IDY102 | |
| ID003 | IDY103 | |
| ID004 | IDY104 | |
| ID005 | IDY105 | |
| ID006 | IDY106 | |
| ID007 | IDY107 | |
| ID008 | IDY108 | |
| ID009 | IDY109 | |
| ID010 | IDY110 | |
| ID011 | | |
| ID012 | | |
| ID013 | | |
| ID014 | | |

FIG. 13

| ID CODE | X1 | X2 | X3 | Y1 | Y2 | Y3 |
|---|---|---|---|---|---|---|
| ID001 | PE | PE | PE | | | |
| ID002 | PE | PE | PE | ST | ST | ST |
| ID003 | PE | PE | PE | | | |
| ID004 | PE | PE | PE | | | |
| ID005 | PE | PE | PE | ST | ST | ST |
| ID006 | PE | PE | PE | | | |
| ID007 | PE | PE | PE | | | |
| ID008 | PE | PE | PE | | | |
| ID009 | PE | PE | PE | ST | ST | ST |
| ID010 | PE | PE | PE | | | |
| ID011 | PE | PE | PE | | | |
| ID012 | PE | PE | PE | | | |
| ID013 | PE | PE | PE | | | |
| ID014 | PE | PE | PE | | | |

FIG. 14

| CLUSTER NUMBER | X1 | X2 | X3 | Y1 | Y2 | Y3 |
|---|---|---|---|---|---|---|
| 001 | ST | ST | ST | ST | ST | ST |
| 002 | ST | ST | ST | ST | ST | ST |
| 003 | ST | ST | ST | ST | ST | ST |

FIG. 24

| 352 | | |
|---|---|---|
| ID_A | X1 | X2 |
| A0001 | x1[1] | x2[1] |
| A0002 | x1[2] | x2[2] |
| A0003 | x1[3] | x2[3] |
| A0004 | x1[4] | x2[4] |
| A0005 | x1[5] | x2[5] |
| A0006 | x1[6] | x2[6] |
| A0007 | x1[7] | x2[7] |
| ⋮ | ⋮ | ⋮ |

| CLUSTER | k | X1 | X2 | FP71 |
|---|---|---|---|---|
| 001 | 2 | ST{x1[1],x1[2]} | ST{x2[1],x2[2]} | ⋮ |
| 002 | 2 | ST{x1[3],x1[4]} | ST{x2[3],x2[4]} | ⋮ |
| 003 | 3 | ST{x1[5],x1[6],x1[7]} | ST{x2[5],x2[6],x2[7]} | ⋮ |
| ⋮ | | | | ⋮ |

| 552 | | |
|---|---|---|
| ID_B | Y1 | Y2 |
| B0001 | y1[1] | y2[1] |
| B0002 | y1[2] | y2[2] |
| B0003 | y1[3] | y2[3] |
| B0004 | y1[4] | y2[4] |
| B0005 | y1[5] | y2[5] |
| B0006 | y1[6] | y2[6] |
| B0007 | y1[7] | y2[7] |
| ⋮ | ⋮ | ⋮ |

| CLUSTER | k | Y1 | Y2 | FP72 |
|---|---|---|---|---|
| 002 | 2 | ST{y1[1],y1[2]} | ST{y2[1],y2[2]} | ⋮ |
| 003 | 3 | ST{y1[3],y1[4],y1[5]} | ST{y2[3],y2[4],y2[5]} | ⋮ |
| 004 | 2 | ST{y1[6],y1[7]} | ST{y2[6],y2[7]} | ⋮ |
| ⋮ | | | | ⋮ |

| CLUSTER | k | X1 | X2 | X3 | Y1 | Y2 | Y3 |
|---|---|---|---|---|---|---|---|
| 001 | 2 | ST | ST | ST | - | - | - |
| 002 | 2 | ST | ST | ST | ST | ST | ST |
| 003 | 3 | ST | ST | ST | ST | ST | ST |
| 004 | 2 | - | - | - | ST | ST | ST |

# INFORMATION PROCESSING SYSTEM, DATA PROVISION SYSTEM, AND RELATED METHOD

CROSS-REFERENCE TO RELATED APPLICATION

This is a national stage application of PCT International Application No. PCT/JP2018/037559, filed on Oct. 9, 2018, entitled "Information Processing System, Data Provision System, and Related Method," which claims the priority based on Japanese Patent Application No. 2017-197105 filed to the Japan Patent Office on Oct. 10, 2017 and Japanese Patent Application No. 2018-060006 filed to the Japan Patent Office on Mar. 27, 2018, and the entire disclosures of PCT International Application No. PCT/JP2018/037559, Japanese Patent Application No. 2017-197105 and Japanese Patent Application No. 2018-060006 are incorporated herein by reference.

TECHNICAL FIELD

The present disclosure relates to an information processing system, a data provision system, and a related method.

BACKGROUND ART

Conventionally, customers' purchasing behavior has been analyzed based on product sales data. In order to help commercial activities, how customers interact with mass media and network contents has also been analyzed.

In recent years, each company holds a huge database containing such data about customers. However, the companies are reluctant to provide such data about customers to the external, mainly for the sake of protection of personal information. When such data is provided externally by the company that holds it, it may be provided in an encrypted form, provided with information enabling identification of a customer significantly deleted, or provided in a modified form intentionally including errors or noise (see Patent Document 1).

PRIOR ART DOCUMENTS

Patent Documents

Patent Document 1: Japanese Unexamined Patent Application Publication No. 2014-109647

SUMMARY OF THE INVENTION

Problems to be Solved by the Invention

As described above, conventionally, the provision of data about customers from a data holding company has been limited for the sake of personal information protection. The data holding companies tend to be reluctant to provide not only the data about customers but also data with fine granularity, due to the high value of the information and concerns about potential disadvantages caused by the provision of such data.

Therefore, according to an aspect of the present disclosure, it is desirable to be able to provide a new technology related to data processing in consideration of information protection.

Means for Solving the Problems

An information processing system according to an aspect of the present disclosure includes an acquisition unit and a combining unit. The acquisition unit is configured to acquire pieces of first feature data relating to a first group. The acquisition unit is further configured to acquire pieces of second feature data relating to a second group. The first group includes first constituents. The second group includes second constituents.

Each of the pieces of first feature data is associated with first identification information related to a corresponding one or more of the first constituents. Each of the pieces of first feature data is configured to indicate a feature of the corresponding one or more the first constituents.

Each of the pieces of second feature data corresponds to one of clusters in the second group. The clusters each include two or more of the second constituents. Each of the pieces of second feature data includes statistic data associated with second identification information related to two or more of the second constituents included in a corresponding cluster. The statistic data has a statistic indicating a feature of the two or more of the second constituents.

The combining unit is configured to combine the pieces of first feature data and the pieces of second feature data, with each of the pieces of first feature data combined with the statistic data about a corresponding two or more of the second constituents, based on the first identification information and the second identification information.

With this information processing system, the pieces of first feature data and the pieces of second feature data can be combined, with the statistic data for each cluster acquired as data about a feature of the second constituents. Therefore, according to an aspect of the present disclosure, the effective data combination can be implemented while implementing information protection.

According to another aspect of the present disclosure, to each of the first constituents, respective individual first identifiers may be assigned. To the second constituents, respective individual second identifiers may be assigned.

The first identification information may include a first identifier assigned to the corresponding one or more of the first constituents. The second identification information may include a second identifier assigned to the two or more of the second constituents.

The combining unit may be configured to combine, based on association between the first identifiers of the first constituents and the second identifiers of the second constituents, each of the pieces of first feature data with a pieces of second feature data associated with a corresponding one of the second identifiers. With this configuration, the pieces of first feature data and the pieces of second feature data can be combined, while the two or more second constituents corresponding to the statistic data are specifically identified based on the second identifiers. Thus, according to an aspect of the present disclosure, the effective data combination conforming to the association between the first constituents and the second constituents can be implemented while implementing information protection.

The second identification information may include an identifier of the corresponding cluster. In this case, the combining unit may be configured to combine the pieces of first feature data and the pieces of second feature data based on information indicating, for each of the clusters, second identifiers assigned to two or more of the second constituents included in a corresponding cluster and/or first identifiers corresponding to the second identifiers in association with the identifier of the corresponding cluster. Also with this configuration, the effective data combination conforming to the association between the first constituents and the second constituents can be implemented.

The first constituents and the second constituents may include a same constituent. One of the first identifiers and one of the second identifiers each assigned to the same constituent may have a same value.

The pieces of first feature data each may correspond to one of clusters in the first group. The clusters in the first group may each include two or more of the first constituents. In this case, each of the pieces of first feature data may include statistic data with a statistic indicating a feature of two or more of the first constituents included in a corresponding one of the clusters. The first identification information may include an identifier of a corresponding cluster.

According to another aspect of the present disclosure, the acquisition unit may be configured to provide cluster information defining the clusters in the second group to a data provision system, and acquire the pieces of second feature data corresponding to the clusters based on the cluster information from the data provision system.

The second constituents in the second group may include a plurality of corresponding constituents corresponding to any of the first constituents. In this case, the information processing system may include a clustering unit configured to cluster the corresponding constituents into a plurality of clusters based on the pieces of first feature data, and generates cluster information indicating a cluster to which each of the corresponding constituents belongs.

The information processing system may include a clustering unit configured to cluster pairs of constituents each being a pair of one first constituent in the first group and one second constituent in the second group that correspond to each other into a plurality of clusters, and generate cluster information indicating a cluster to which each of the pairs of constituents belong.

The acquisition unit may be configured to provide the cluster information generated by the clustering unit to the data provision system, and acquire the pieces of second feature data corresponding to the clusters based on the cluster information from the data provision system.

The acquisition unit may be configured to provide the cluster information to a first data provision system and acquire the pieces of first feature data corresponding to the clusters based on the cluster information from the first data provision system, and is further configured to provide the cluster information to a second data provision system, and acquire the pieces of second feature data corresponding to the clusters based on the cluster information from the second data provision system. In this case, the pieces of first feature data each may have a statistic indicating a feature of two or more of the first constituents included in a corresponding one of the clusters.

The first data provision system may be a system holding pieces of individual feature data corresponding to the first constituents, and the pieces of individual feature data may each indicate a feature of a corresponding one of the first constituents. The second data provision system may be a system holding pieces of individual feature data corresponding to the second constituents, and the pieces of individual feature data may each indicate a feature of a corresponding one of the second constituents.

The information processing system may include an integration unit that, based on the cluster information, integrates pieces of individual feature data of two or more of the first constituents included in a corresponding cluster through a statistic process for each of the clusters, to generate a piece of cluster feature data with a statistic indicating a feature of the two or more of the first constituents for each of the clusters. In this case, the acquisition unit may be configured to acquire pieces of cluster feature data each generated for a corresponding one of the clusters by the integration unit, as the pieces of first feature data.

The acquisition unit may be configured to determine a pair of one of the first constituents and one of the second constituents corresponding to each other based on information indicating association between the first identifiers of the first constituents and the second identifiers of the second constituents.

The clustering unit may be configured to acquire similarity information about at least one of a similarity between the first constituents and a similarity between the second constituents. The clustering unit may be configured to cluster the pairs of constituents into a plurality of clusters based on the similarity information acquired.

The clustering unit may be configured to acquire at least one of first attribute information indicating a first attribute value of each of the first constituents and second attribute information indicating a second attribute value of each of the second constituents. The clustering unit may be configured to determine at least one of a similarity between the first constituents and a similarity between the second constituents based on the at least one of the first attribute information and the second attribute information acquired. The clustering unit may be configured to cluster the pairs of constituents into a plurality of clusters based on the similarity determined.

The acquisition unit may be configured to request a data provision system to cluster the second constituents into a plurality of clusters based on a designated constraint condition, and acquire the pieces of second feature data corresponding to the clusters based on the constraint condition from the data provision system.

With the constraint condition designated, the information processing system can control the clustering in the data provision system so that the effective pieces of second feature data can be acquired from the data provision system. Thus, the information value of the pieces of second feature data transmitted from the data provision system can be prevented from being compromised due to inappropriate clustering in the data provision system.

The second constituents in the second group may include a plurality of corresponding constituents each corresponding to any one of the first constituents and a plurality of non-corresponding constituents corresponding to none of the first constituents. In this case, the pieces of second feature data acquired by the acquisition unit may each correspond to one of clusters defined by clustering the corresponding constituents in the second group.

The acquisition unit may be configured to transmit one of a list of the first constituents and a list of the corresponding constituents to a data provision system, and acquire the pieces of second feature data from the data provision system. The data provision system may be configured to identify the corresponding constituents in the second group based on the list.

The acquisition unit may be configured to transmit distance information indicating distances between the constituents in the list on a feature space to the data provision system, to request the data provision system to cluster the corresponding constituents in the second group into a plurality of clusters based on the distance information. The provision of the distance information contributes to appropriate clustering in the data provision system.

The acquisition unit may be configured to transmit classification information indicating a classification of each of the constituents in the list to the data provision system, to request the data provision system to cluster the corresponding constituents in the second group into a plurality of clusters based on the classification information so that each of the clusters does not include corresponding constituents that are different from each other in the classification. The provision of the classification information contributes to appropriate clustering in the data provision system.

Each of the corresponding constituents in the second group may be a constituent that is the same as any one of the first constituents in the first group. Between the first group and the second group, to the corresponding constituents, the first and the second identifiers that are the same may be assigned. The combining unit may be configured to combine pieces of first feature data and pieces of second feature data, with the pieces of first feature data each combined the statistic data in a corresponding piece of second feature data associated with a same identifier.

Another aspect of the present disclosure may provide a system including the information processing system described above and a data provision system. The data provision system may hold pieces of individual feature data corresponding to the second constituents and each indicating a feature of a corresponding one of the second constituents.

The data provision system may generates the statistic data, for each of the clusters in the second group, by converting features of two or more of the second constituents included in a corresponding cluster and indicated by pieces of individual feature data of the two or more of the second constituents into a statistic. The data provision system may be configured to transmit the pieces of second feature data corresponding to the clusters and each including statistic data of the corresponding cluster to the information processing system.

The data provision system can provide the information processing system with information effectively contributing the data combination. This is because the features of the second constituents in the second group are provided to the information processing system as the statistic data, with the second identification information associated with the statistic data.

The data provision system may be configured to receive the cluster information from the information processing system. The data provision system may be configured to transmit pieces of second feature data corresponding to the clusters in the second group determined based on the cluster information, to the information processing system.

The data provision system may be configured to cluster the second constituents into a plurality of clusters based on a constraint condition designated by the information processing system, and transmit the pieces of second feature data corresponding to the clusters to the information processing system. This data provision system can provide the information processing system with appropriate pieces of second feature data satisfying the condition designated by the information processing system.

The information processing system may transmit, as information indicating the constraint condition, distance information indicating distances between the first constituents on a feature space to the data provision system. The data provision system may cluster the corresponding constituents in the second group into a plurality of clusters based on the distance information received from the information processing system.

The information processing system transmits, as information indicating the constraint condition, classification information indicating a classification of each of the first constituents, to the data provision system. The data provision system may cluster the corresponding constituents in the second group into a plurality of clusters based on the classification information received from the information processing system so that each of the clusters does not include corresponding constituents that are different from each other in the classification.

Another aspect of the present disclosure may provide an information processing method corresponding to any of the information processing systems described above. The information processing method may be implemented by a computer. The information processing method may include acquiring pieces of first feature data. The information processing method may include acquiring pieces of second feature data. The information processing method may include combining the pieces of first feature data acquired with the pieces of second feature data acquired. The information processing method may include generating cluster information. The information processing method may include generating a piece of cluster feature data for each cluster.

The acquiring the pieces of first feature data may include reading the pieces of first feature data from a storing device that stores the pieces of first feature data. The acquiring the pieces of second feature data may include acquiring the pieces of second feature data from the data provision system that provides the pieces of second feature data.

The acquiring the pieces of first feature data may include transmitting the cluster information to a first data provision system and acquiring the pieces of first feature data corresponding to the clusters based on the cluster information from the first data provision system. The acquiring the pieces of second feature may include transmitting the cluster information to a second data provision system, and acquiring the pieces of second feature data corresponding to the clusters based on the cluster information from the second data provision system.

Another aspect of the present disclosure may provide a computer program including instructions for causing a computer to perform the above-described information processing method when executed by the computer. Another aspect of the present disclosure may provide a computer-readable recording medium that stores the computer program. The recording medium may be a non-transitory computer-readable recording medium.

Another aspect of the present disclosure may provide an information processing system including: a clustering unit configured to cluster pairs of constituents each being a pair of one first constituent in a first group and one second constituent in a second group that correspond to each other into a plurality of clusters, and generate cluster information indicating a cluster to which each of pairs of constituents belongs; a first acquisition unit configured to acquire pieces of first feature data corresponding to the clusters generated based on the cluster information and each having a statistic indicating a feature of two or more of first constituents included in a corresponding one of the clusters; a second acquisition unit configured to acquire pieces of second feature data corresponding to the clusters generated based on the cluster information and each having a statistic indicating a feature of two or more of second constituents included in a corresponding one of the clusters; and a combining unit configured to combine the pieces of first feature data and the pieces of second feature data so that the pieces of first feature data are each combined with a piece of second feature data corresponding to a same cluster.

Another aspect of the present disclosure may provide an information processing method performed by a computer, the method including: clustering pairs of constituents each being a pair of one first constituent in a first group and one second constituent in a second group that correspond to each other into a plurality of clusters, to generate cluster information indicating a cluster to which each of the pairs of constituents belongs; acquiring pieces of first feature data corresponding to the clusters generated based on the cluster information and each having a statistic indicating a feature of two or more of first constituents included in a corresponding one of the clusters; acquiring pieces of second feature data corresponding to the clusters generated based on the cluster information and each having a statistic indicating a feature of two or more of second constituents included in a corresponding one of the clusters; and combining the pieces of first feature data and the pieces of second feature data so that the pieces of first feature data are each combined with a piece of second feature data corresponding to a same cluster.

Another aspect of the present disclosure may provide a data provision system including: a storage unit configured to store pieces of individual feature data corresponding to a plurality of constituents; a clustering unit configured to cluster the constituents into a plurality of clusters; a generation unit configured to generate pieces of cluster feature data corresponding to the clusters; and a provision unit configured to provide the pieces of cluster feature data generated by the generation unit to an information processing system, wherein the pieces of individual feature data are each associated with an identifier of a corresponding one of the constituents, the pieces of individual feature data each indicate a feature of the corresponding one of the constituents, the pieces of cluster feature data each include statistic data having a statistic indicating a feature of two or more of the constituents associated with identifiers of the two or more of the constituents included in a corresponding cluster, and the generation unit generates the statistic data by converting features of two or more constituents indicated by pieces of individual feature data about the two or more constituents into the statistic. Optionally, the clustering unit may be configured to cluster a plurality of constituents into a plurality of clusters according to a constraint condition designated by the information processing system.

Another aspect of the present disclosure may provide a data provision system including: a storage unit configured to store pieces of individual feature data corresponding to a plurality of constituents; a clustering unit configured to cluster the constituents into a plurality of clusters; a generation unit configured to generate pieces of cluster feature data corresponding to the clusters; and a provision unit configured to provide the pieces of cluster feature data generated by the generation unit to an information processing system, wherein the pieces of individual feature data each indicate a feature of a corresponding one of the constituents, the pieces of cluster feature data each include statistic data having a statistic indicating a feature of two or more of the constituents included in a corresponding cluster, the clustering unit clusters the constituents into the clusters based on a constraint condition designated by the information processing system, and the generation unit generates the statistic data by converting features of two or more constituents indicated by pieces of individual feature data about the two or more constituents into the statistic.

Another aspect of the present disclosure may provide a data provision method performed by a computer, the method including: acquiring pieces of individual feature data corresponding to a plurality of constituents; clustering the constituents into a plurality of clusters; generating pieces of cluster feature data corresponding to the clusters; and providing the pieces of cluster feature data generated to an information processing system, wherein the pieces of individual feature data are each associated with an identifier of a corresponding one of the constituents, the pieces of individual feature data each indicate a feature of a corresponding one of the constituents, the pieces of cluster feature data each include statistic data having a statistic indicating a feature of two or more of the constituents included in a corresponding cluster, associated with identifiers of the two or more of the constituents included in the corresponding cluster, and the generating include generating the statistic data by converting features of two or more constituents indicated by pieces of individual feature data about the two or more constituents into the statistic. Optionally, the clustering may include clustering a plurality of constituents into a plurality of clusters according to a constraint condition designated by the information processing system.

Another aspect of the present disclosure may provide a data provision method performed by a computer, the method including: acquiring pieces of individual feature data corresponding to a plurality of constituents; clustering the constituents into a plurality of clusters; generating pieces of cluster feature data corresponding to the clusters; and providing the pieces of cluster feature data generated to an information processing system, wherein the pieces of individual feature data each indicate a feature of a corresponding one of the constituents, the pieces of cluster feature data each include statistic data having a statistic indicating a feature of two or more of the constituents included in a corresponding cluster, the clustering includes clustering the constituents into the clusters based on a constraint condition designated by the information processing system, and the generating includes generating the statistic data by converting features of two or more constituents indicated by pieces of individual feature data about the two or more constituents into the statistic.

According to another aspect of the present disclosure, any of the methods described above may be provided in a form of one of a computer program including instructions for causing a computer to perform a corresponding method when executed by the computer and a computer-readable recording medium that stores the computer program.

BRIEF DESCRIPTION OF THE DRAWINGS

FIG. 2A is a diagram showing a configuration of a first database, and FIG. 2B is a diagram showing a configuration of a second database.

FIG. 6 is a diagram showing a configuration of a processed database based on the second database.

FIG. 7 is a diagram showing a configuration of a combined database.

FIG. 8A is a diagram showing a specific example of cluster feature data, and FIG. 8B is a diagram showing a specific example of a combined database.

FIG. 10A is a diagram showing a configuration of a third database, and FIG. 10B is a diagram showing a configuration of a processed database based on the third database.

FIG. 11 is a diagram showing a configuration of an extended combined database.

FIG. 12A is a diagram showing a configuration of a second database according to the third embodiment, and FIG. 12B is a diagram showing a configuration of a processed database according to the third embodiment.

FIG. 13 is an explanatory diagram relating to an association table.

FIG. 14 is a diagram showing a configuration of a combined database according to the third embodiment.

FIG. 24 is a diagram showing a configuration of a combined database according to the eighth embodiment.

FIG. 33A is an explanatory diagram related to processing of the first database, and FIG. 33B is an explanatory diagram relating to processing of the second database.

FIG. 34 is a diagram showing a configuration of a combined database.

Figure 1:
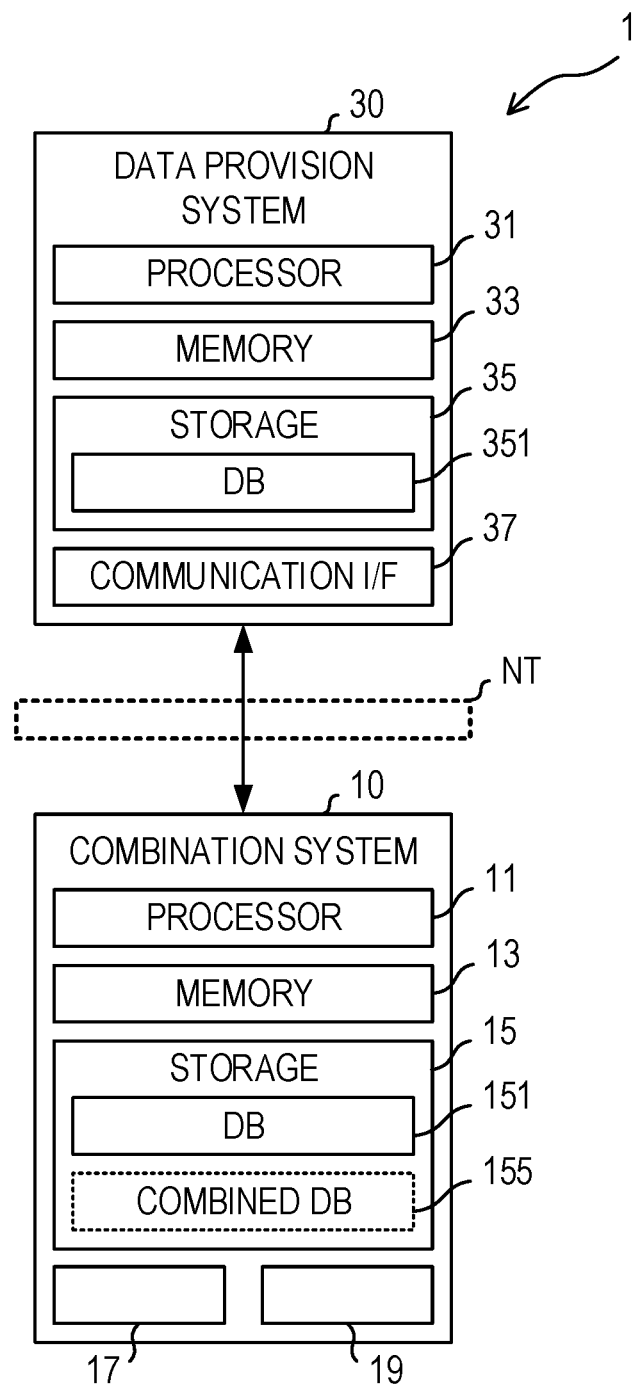
FIG. 1 is a block diagram showing a configuration of a data processing system according to a first embodiment.

EXPLANATION OF REFERENCE NUMERALS 1, 2, 7 . . . Data processing system, 10 . . . Combination system, 11, 31, 51 . . . Processor, 13, 33, 53 . . . Memory, 15, 35, 55 . . . Storage device, 30, 50 . . . Data provision system, 151, 352 . . . First database, 155, 156, 157 . . . Combined database, 351, 552 . . . Second database, 551 . . . Third database, F1, F2, F3, F4, F71, F72 . . . Individual feature data, FC1, FC2, FC3, FC4, FC6, FC71, FC72 . . . Cluster feature data, FP2, FP3, FP4, FP6, FP71, FP72 . . . Processed database, FS2, FS3, FS4, FSI . . . Statistic data, L4, L5, L6, L71, L72, L81, L82, L91, L92 . . . List, CD1, CD5 . . . First cluster information, CD2, CD6 . . . Second cluster information, CT91, CT92 . . . Conversion table

MODE FOR CARRYING OUT THE INVENTION

Hereinafter, exemplary embodiments of the present disclosure will be described with reference to the drawings.

First Embodiment

A data processing system 1 according to a first embodiment includes a combination system 10 and a data provision system 30, as illustrated in FIG. 1. In this data processing system 1, a combined database 155 is generated based on a first database 151 related to a first group of consumers held by a combination system 10 and a second database 351 related to a second group of consumers held by the data provision system 30.

The combination system 10 includes a processor (CPU) 11, a memory 13, a storage device 15, a communication interface 17, and a user interface 19. The combination system 10 is communicably connected to the data provision system 30 via the communication interface 17 and a network NT. The processor 11 performs a process according to a computer program stored in the storage device 15. The memory 13 includes a ROM and a RAM. The storage device 15 includes the first database 151.

As illustrated in FIG. 2A, for each consumer in the first group, a piece of feature data F1 about a corresponding individual consumer is held in the first database 151. The consumers in the first group correspond to constituents of the first group. Hereinafter, a piece of feature data about an individual consumer is referred to as a piece of individual feature data, and the piece of individual feature data F1 held in the first database 151 is referred to as a piece of first individual feature data F1. As illustrated in FIG. 2A, the piece of first individual feature data F1 is expressed by a single row of data. The piece of first individual feature data F1 indicates features of the corresponding single consumer in association with an identification code of the consumer. Specifically, the piece of first individual feature data F1 indicates the features of the corresponding consumer using a plurality of parameters X1, X2, and X3.

As illustrated in FIG. 2A, the piece of first individual feature data F1 indicates the features of the corresponding consumer using the three parameters X1, X2, and X3. However, this is only a simplified example in consideration of the size of the drawing. The piece of first individual feature data F1 may indicate the features of the consumer with more than three parameters X1, X2, and X3.

In FIG. 2A, the values of the parameters X1, X2, and X3 of each consumer are "PE". This expression "PE" indicates that the corresponding value is personal information to be protected. The meaning of this expression "PE" is the same in other drawings. Examples of the parameters X1, X2, and X3 include demographic attributes such as parameters related to the age, gender, and residential area of the corresponding consumer, as well as parameters related to the consumption behavior of the corresponding consumer. Examples of the parameters related to the consumption behavior include information such as a used store, a purchased product, a purchase timing, the number of purchases, and a purchase price.

The storage device 15 further stores the combined database 155 generated by a process performed by the processor 11.

As illustrated in FIG. 1, the data provision system 30 includes a processor 31, a memory 33, a storage device 35, and a communication interface 37. The data provision system 30 is communicably connected to the combination system 10 via the communication interface 37 and the network NT.

The processor 31 performs a process according to a computer program stored in the storage device 35. The memory 33 includes a ROM and a RAM. The storage device 35 stores the second database 351.

The second database 351 has a piece of individual feature data F2 for each of consumers in the second group. The consumers in the second group correspond to constituents of the second group. Hereinafter, a piece of individual feature data F2 held in the second database 351 is referred to as a piece of second individual feature data F2. As illustrated in FIG. 2B, the piece of second individual feature data F2 indicates features of the corresponding single consumer in association with an identification code of the consumer, as in the case of the first individual feature data F1. Specifically, the piece of second individual feature data F2 indicates features of the corresponding consumer using a plurality of parameters Y1, Y2, and Y3. The number of parameters is not limited, as in the case of the first individual feature data F1.

The parameters Y1, Y2, and Y3 include parameters that are at least partially different from the parameters X1, X2, and X3 in the first individual feature data F1. For example, the parameters Y1, Y2, and Y3 may include parameters related to the consumption behavior for a product different from that in the first individual feature data F1.

The consumers in the second group includes some of the consumers in the first group. Hereinafter, a consumer in both the first group and the second group, that is, a consumer that is common between the first group and the second group will be referred to as a common consumer. The pieces of first individual feature data F1 and pieces of second individual feature data F2 in a range indicated by a sign C in FIGS. 2A and 2B correspond to the pieces of first individual feature data F1 and the pieces of second individual feature data F2 about the common consumers.

As can be seen in FIGS. 2A and 2B, the first database 151 and the second database 351 use a common identification code as a consumer identification code. Specifically, an identification code indicating the same value is associated with the piece of first individual feature data F1 and the piece of second individual feature data F2 about the same consumer.

To thus use the common identification code, a company holding the first database 151 or an operating company of the combination system 10 can issue the identification code to a company holding the second database 351. Examples of the identification code include a cookie ID. By tracking consumer terminal devices using cookie technology, common identification codes can be used.

Next, details of processes performed by the combination system 10 and the data provision system 30 will be described. The processor 11 of the combination system 10 performs a combined database generation process in FIG. 3 upon receiving an instruction to generate the combined database 155 from an operator through the user interface 19. The processor 31 of the data provision system 30 performs a request receiving process illustrated in FIG. 4 upon receiving a request signal from the combination system 10.

In the combined database generation process, the processor 11 of the combination system 10 reads the first database 151 of the combination system 10 from the storage device 15 among the first database 151 and the second database 351 to be combined (S110). Then, common consumers between the first group and the second group is identified (S120).

Specifically, the processor 11 may transmit a list request signal requesting the data provision system 30 for a second group consumer list (S121), and receive the second group consumer list from the data provision system 30 (S123) for identifying the common consumers.

Figure 4:
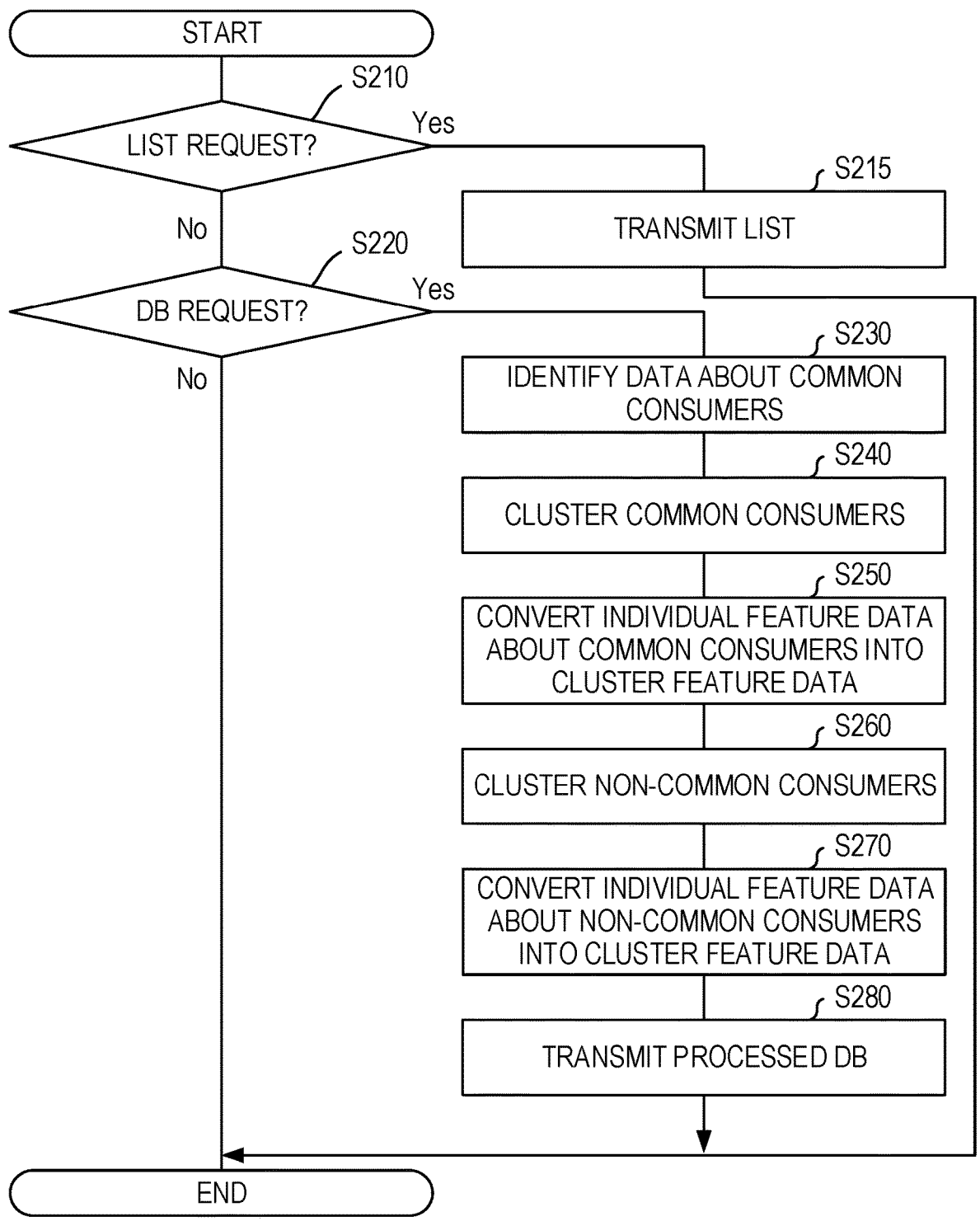
FIG. 4 is a flowchart of a process performed by a data provision system.

As illustrated in FIG. 4, the processor 31 of the data provision system 30 that has received the list request signal from the combination system 10 (Yes in S210) refers to the second database 351 and transmits the second group consumer list to the combination system 10 (S215). The second group consumer list is a list of consumers corresponding to the pieces of second individual feature data F2 registered in the second database 351, The second group consumer list includes the identification codes of the consumers of the second group, but does not include personal information of the consumers.

After receiving the consumer list, the processor 11 of the combination system 10 can identify the common consumers between the first group and the second group by comparing the identification codes of the consumers in the second group indicated by the consumer list with the identification codes of the consumers in the first group indicated by the first database 151 read in S110 (S125).

After identifying the common consumers in S120, the processor 11 transmits a database request signal to the data provision system 30 (S130). The list of common consumers identified in S120 is attached to the database request signal. The list of common consumers includes identification codes of common consumers in the first group.

As illustrated in FIG. 4, the processor 31 of the data provision system 30 that has received the database request signal from the combination system 10 (Yes in S220) refers to the second database 351 based on the list of common consumers attached to the database request signal to identify pieces of second individual feature data F2 about the common consumers (S230).

Thereafter, the processor 31 clusters the common consumers into a plurality of clusters based on the pieces of second individual feature data F2 about the common consumers (S240). The clustering can be performed based on, for example, the k-means method or other known techniques.

The clustering is performed in such a manner that each cluster is obtained with the number of consumers (corresponding to the cluster size) being equal to or larger than a predetermined number. The predetermined number is determined for the sake of personal information protection. The clustering is performed based on the distribution of the common consumers distributed in a feature space. Specifically, a plurality of consumers separated from each other by short distances in the feature space are clustered into one cluster.

At the time of clustering, the processor 31 can determine distances Dy [i,j] between the common consumers using the Euclidean distance. Each distance Dy [i,j] between a consumer i and a consumer j can be calculated by the following equation.

$$Dy[i,j] = \{\Sigma(yn[i] - yn[j])^2\}^{1/2}$$

where $\Sigma(yn[i]-yn[j])^2$ is the sum total of $(yn[i]-yn[j])^2$ from n=1 to The value N corresponds to the number of parameters Y1, Y2, Y3 representing features of a consumer in the piece of second individual feature data F2. According to FIG. 2B, N=3.

In the equation, yn[i] is the value of a parameter Yn of the consumer i. Furthermore, yn[j] is the value of a parameter Yn of the consumer j. In the second database 351 illustrated in the left section of FIG. 5, y1[i] and y2[i] (i=1, 2, 3 . . . ) indicate the values of the parameters Y1 and Y2 in the second individual feature data F2 about the consumer i.

When the common consumers in the second group are clustered into a plurality of clusters in S240, the processor 31 proceeds to S250 to generate for each of the clusters, a piece of cluster feature data FC2 by integrating pieces of second individual feature data F2 about consumers belonging to the corresponding cluster.

Specifically, the processor 31 converts the values of the parameters Y1, Y2, and Y3 indicated by the pieces of the second individual feature data F2 about the consumers in the corresponding cluster into one statistic ST for each parameter, and generates the piece of cluster feature data FC2 corresponding to the cluster.

Figure 5:
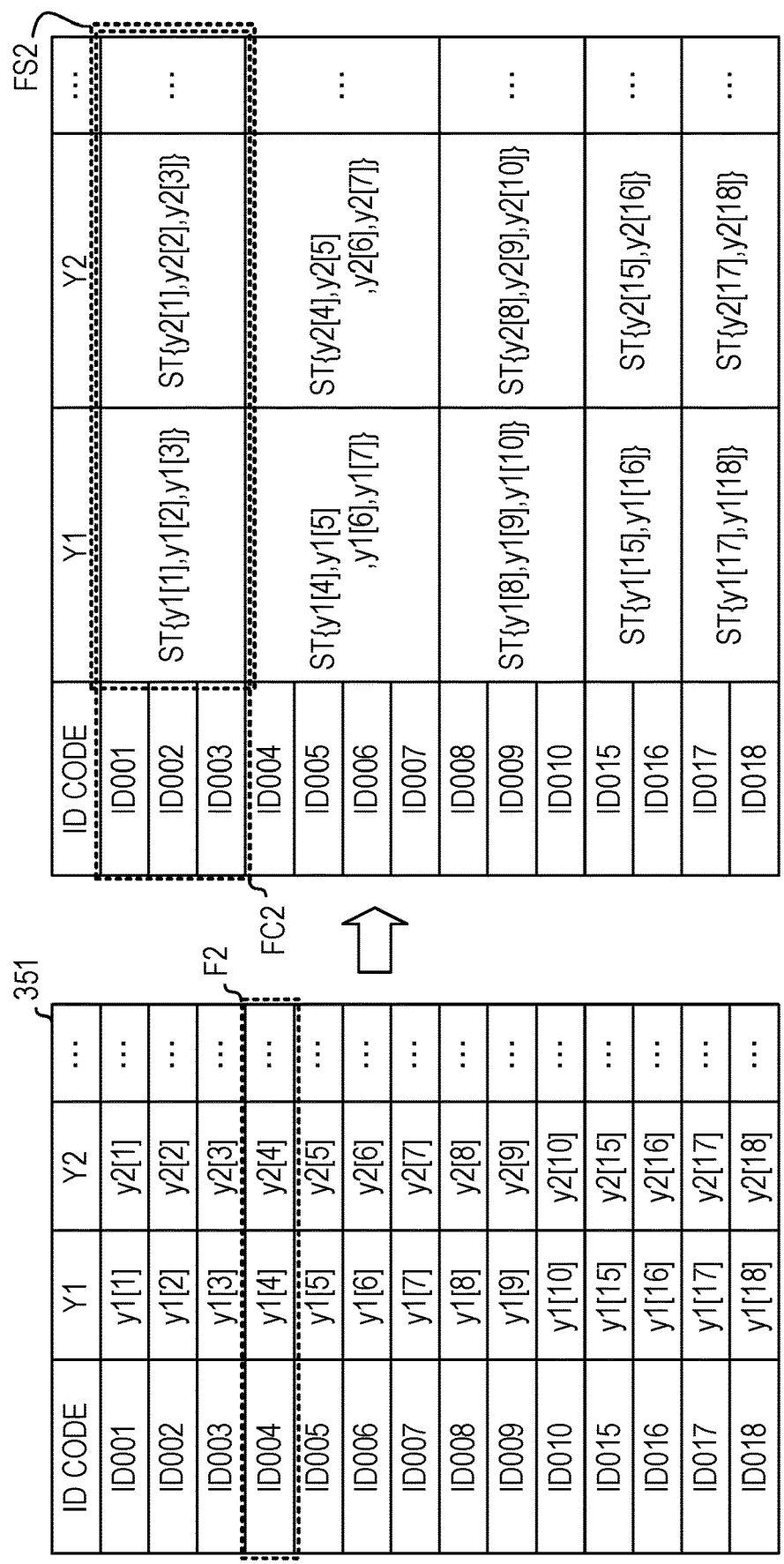
FIG. 5 is an explanatory diagram related to generation of cluster feature data.

The right section of FIG. 5 illustrates the piece of cluster feature data FC2 generated based on the pieces of second individual feature data F2 illustrated in the left section of FIG. 5.

According to the example illustrated in FIG. 5, consumers with identification codes ID001, ID002, and ID003 are clustered into one cluster, and one piece of cluster feature data FC2 is generated based on pieces of the second individual feature data F2 about these consumers.

According to this example, values y1[1], y1[2], and y1[3] of the parameter Y1 corresponding to the identification codes ID001, ID002, ID003 are converted into one statistic ST {y1[1], y1 [2], y1[3]}. Here, the expression ST{ } may be understood to mean the statistic of the values in parentheses { }. Similarly, the values y2[1], y2[2], and y2[3] of the parameter Y2 are converted into one statistic ST {y2[1], y2[2], y2[3]}. Similarly, the values y3[1], y3[2], and y3[3] of the parameter Y3 are converted into one statistic ST {y3[1], y3[2], y3[3]}.

As a result, the pieces of second individual feature data F2 about the consumers with the identification codes ID001, ID002, and ID003 in the same cluster is converted into one piece of cluster feature data FC2 including statistic data FS2 with the statistics ST{y1[1],y1[2],y1[3]}, ST{y2[1],y2[2], y2[3]}, and ST{y3[1],y3[2],y3[3]} of the parameters Y1, Y2, and Y3 indicating the features of the consumers in the same cluster. The piece of cluster feature data FC2 includes the identification codes ID001, ID002, and ID003 of consumers in the corresponding cluster in association with the statistic data FS2.

The statistic ST may be determined in advance for each type of the parameters Y1, Y2, Y3. Examples of the statistic ST include a ratio, an average, a median, a maximum, a standard deviation, and a variance. The average, median, and maximum correspond to the representative value of the cluster. The statistic ST may be a combination of different statistics.

For example, when the parameter indicates gender, the statistic ST may indicate the male and/or female percentage(s) in the cluster. When the parameter indicates age, the statistic ST may represent the average age in the cluster. When the parameter indicates a product purchase history, the statistic ST may indicate a percentage of consumers in the cluster with a history of the product purchase. When the parameter indicates the number of purchased items, the statistic ST may be one or a combination of an average value, a median value, and a maximum value of the number of purchased items.

As illustrated in FIG. 5, similarly, the consumers with the identification codes ID004, ID005, ID006, and ID007 are clustered into one cluster, and one piece of cluster feature data FC2 with the statistics ST indicating the features of these consumers is generated. Similarly, the consumers with the identification codes ID008, ID009, and ID0010 are clustered into one cluster, and one piece of cluster feature data FC2 with the statistics ST indicating the features of these consumers is generated.

After the process in S250, the processor 31 clusters non-common consumers in the second group into a plurality of clusters (S260). As a result, in the present embodiment, the non-common consumers in the second group are clustered separately from the common consumers, whereby the common consumers and the non-common consumers will not be mixed in one cluster.

The clustering in S260 is performed as in S240. Specifically, the clustering is performed in such a manner that each cluster is obtained with the number of consumers being equal to or larger than the predetermined number. The clustering is performed based on the distribution of the non-common consumers distributed in the feature space. Specifically, a plurality of consumers separated from each other by short distances in the feature space are clustered into one cluster.

The processor 31 then proceeds to S270, and generates one piece of cluster feature data FC2 for each of the clusters related to the non-common consumers. The generation of the piece of cluster feature data FC2 in S270 is performed as in the process in S250.

According to the example illustrated in FIG. 5, the non-common consumers with the identification codes ID015 and ID016 are clustered into one cluster, and one piece of cluster feature data FC2 with the statistics ST indicating the features of these consumers is generated. Similarly, the consumers with the identification codes ID017 and ID0018 are clustered into one cluster, and one piece of cluster feature data FC2 with the statistics ST indicating the features of these consumers is generated.

In the present embodiment, pieces of second individual feature data F2 are integrated to generate one piece of cluster feature data FC2 for protecting personal information about consumers. Therefore, the number of consumers in a cluster is preferably more than two. The number of consumers in the cluster in the above example is two merely for the sake of simplicity of description and illustration.

After completing the process in S270, the processor 31 transmits the pieces of cluster feature data FC2 about the common consumers and the non-common consumers generated in S250 and S270 as a processed database FP2 to the combination system 10 that is the database request source (S280).

FIG. 6 illustrates an example of the processed database FP2. As can be seen in FIG. 6, the processed database FP2 has a piece of cluster feature data FC2 for each cluster, for each of the common consumers and the non-common consumers. In FIG. 6, expressions "ST" represent the values of the parameters Y1, Y2, Y3 in the pieces of cluster feature data FC2. This expression "ST" indicates that the value of the corresponding parameter is the statistic ST. The bold solid line in FIG. 6 indicates the boundary between common consumers and non-common consumers.

Upon receiving the processed database FP2 transmitted from the data provision system 30 (S140) in response to the database request signal transmitted in S130, the processor 11 of the combination system 10 proceeds to S150. In S150, the processor 11 combines the first database 151 and the processed database FP2 received from the data provision system 30, to generate the combined database 155. FIG. 7 illustrates an example of the combined database 155.

In S150, the processor 11 generates the combined database 155 by combining the pieces of first individual feature data F1 and the pieces of the cluster feature data FC2, with each piece of first individual feature data F1 combined with statistic data FS2 of the piece of cluster feature data FC2 associated with the corresponding identification code based on the identification code associated with the piece of first individual feature data F1.

Specifically, in S150, the combined database 155 is generated with each piece of first individual feature data F1 combined with the statistic data FS2 of the corresponding piece of cluster feature data FC2 associated with the identification code corresponding to the piece of first individual feature data F1. However, the pieces of first individual feature data F1 about the non-common consumers in the first group is registered in the combined database 155 without being combined with the pieces of cluster feature data FC2. Similarly, the pieces of cluster feature data FC2 about the non-common consumers in the second group is registered in the combined database 155 without being combined with the pieces of first individual feature data F1. In this manner, the combined database 155 is generated.

As another example, each piece of cluster feature data FC2 provided from the data provision system 30 may be configured to hold, as the statistic data FS2, a piece of statistic data FSI for each of consumers in the corresponding cluster as illustrated in FIG. 8A. In this case, pieces of the statistic data FSI about respective consumers in the corresponding cluster are the same data obtained by duplicating the statistic data and indicates the same statistics.

In this case, in the combined database 155, as illustrated in FIG. 8B, the piece of first individual feature data F1 for each consumer is combined with the piece of statistic data FSI of the corresponding piece of cluster feature data FC2.

According to the example illustrated in FIG. 7, one cluster is obtained by grouping consumers with continuous identification codes. However, this is for the sake of simplicity of illustration. Actually, the clustering is performed to group consumers separated by a short distance from each other in the feature space, and thus has similar features, into one cluster. Thus, generally, a plurality of consumers in one cluster are dispersed in the first database 151 and in the second database 351.

In this context, preparing one piece of statistic data FSI for each consumer is convenient, because there will be no need for the consumers to be rearranged in the processed database FP2 and in the combined database 155 to make the consumers in a single cluster to be arranged adjacently.

In the present embodiment, the data provision system 30 can provide consumer related data with identification codes of consumers, to the combination system 10, while protecting personal information. The combination system 10 can accurately combine data pieces related to the same consumer based on the identification codes to generate the effective combined database 155 for consumers. Thus, the combined database 155 is extremely useful for analyzing consumer behavior.

Second Embodiment

Figure 9:
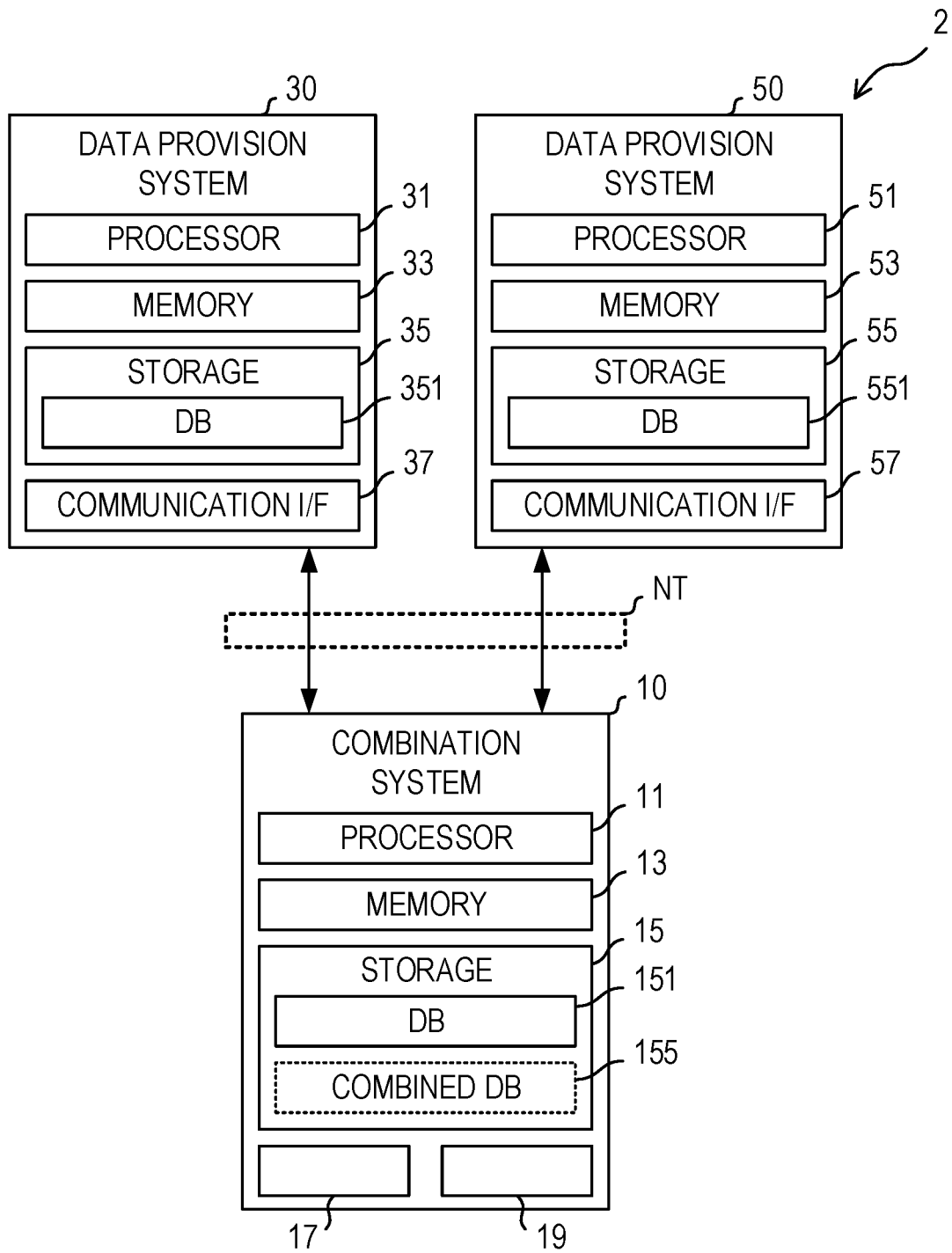
FIG. 9 is a block diagram showing a configuration of a data processing system according to a second embodiment.

Next, a data processing system 2 according to a second embodiment will be described. As illustrated in FIG. 9, the data processing system 2 according to the present embodiment has a configuration obtained by adding a data provision system 50 to the data processing system 1 according to the first embodiment. Thus, the data processing system 2 includes the data provision system 50 in addition to the combination system 10 and the data provision system 30.

Hereinafter, the data provision system 30 will be referred to as a first data provision system 30, and the data provision system 50 will be referred to as a second data provision system 50. Furthermore, components of the data processing system 2 according to the second embodiment that are the same as those in the first embodiment will be denoted with the same reference numerals, and the description thereof will be omitted as appropriate.

The second data provision system 50 includes a processor 51, a memory 53, a storage device 55, and a communication interface 57. The second data provision system 50 is communicably connected to the combination system 10 via the communication interface 57 and the network NT. The processor 51 performs a process according to a computer program stored in the storage device 55. The storage device 55 stores a third database 551 related to a third group of consumers.

As illustrated in FIG. 10A, the third database 551 holds a piece of individual feature data F3 for each consumer in the third group. Hereinafter, a piece of individual feature data F3 held in the third database 551 will be referred to as a piece of third individual feature data F3. The piece of third individual feature data F3 indicates features of the corresponding single consumer in association with an identification code of the consumer. Specifically, the piece of third individual feature data F3 indicates the features of the corresponding consumer using a plurality of parameters Z1, Z2, and Z3. The number of parameters is not limited, as in the case of the first and the second individual feature data F1 and F2.

The parameters Z1, Z2, and Z3 are parameters that are at least partially different from the parameters X1, X2, and X3 in the first individual feature data F1 and from the parameters Y1, Y2, and Y3 in the second individual feature data F2. The parameters Z1, Z2, and Z3 may include parameters related to the consumption behavior for a product different from those in the first individual feature data F1 and in the second individual feature data F2.

As can be seen in FIG. 10A, common consumers between the first group and the third group are different from the common consumers between the first group and the second group. According to the example illustrated in FIG. 2B, the common consumers between the first group and the second group are the consumers with the identification code ID001 to the identification code ID010, whereas according to the example illustrated in FIG. 10A, the common consumers between the first group and the third group are common consumers with the identification code ID005 to the identification code ID014, as indicated by a sign C.

In the present embodiment, the processor 11 of the combination system 10 configured to combine a processed database FP3 based on the third database 551 acquired from the second data provision system 50 to the combined database 155 based on the first database 151 and the processed database FP2 acquired from the first data provision system 30, to extend the combined database 155. Thus, the processor 11 performs the processes in S120-S140 illustrated in FIG. 3 also on the second data provision system 50, and acquires the processed database FP3 from the second data provision system 50.

The processor 51 of the second data provision system 50 performs the process illustrated in FIG. 4, as in the first data provision system 30, and upon receiving the list request signal from the combination system 10 (Yes in S210), provides a third group consumer list to the combination system 10 (S215).

Upon receiving the database request signal from the combination system 10 (Yes in S220), the processor 51 of the second data provision system 50 identifies pieces of third individual feature data F3 about the common consumers between the first group and the third group (S230). The processor 51 clusters the common consumers between the first group and the third group into a plurality of clusters based on the pieces of third individual feature data F3 (S240), and generates a piece of cluster feature data FC3 for each cluster (S250). FIG. 10B illustrates the piece of cluster feature data FC3.

The clustering and the generation of the cluster feature data FC3 in the second data provision system 50 are performed in a manner similar to that in the first data provision system 30. Specifically, for each cluster, the processor 51 converts the values of the parameters Z1, Z2, and Z3 indicated by the pieces of third individual feature data F3 about the consumers in the corresponding cluster into one statistic ST for each parameter, and generates one piece of cluster feature data FC3 corresponding to the cluster (S250). The piece of cluster feature data FC3 holds statistic data FS3 including a statistic ST for each parameter in association with identification codes of consumers belonging to the cluster.

The processor 51 further clusters non-common consumers in the third group and not in the first group into a plurality of clusters (S260), and generates one piece of cluster feature data FC3 for each cluster (S270). The pieces of cluster feature data FC3 about the common consumers and the non-common consumers are transmitted as the processed database FP3 to the combination system 10 (S280). The bold solid line illustrated in FIG. 10B indicates the boundary between the common consumers and the non-common consumers between the first group and the third consumer group in the processed database FP3.

Upon receiving the processed database FP3 from the second data provision system 50 (S140), the processor 11 of the combination system 10 extends the combined database 155 based on the processed database FP3 (S150). That is, the processor 11 extends the combined database 155 by further combining the processed database FP3 based on the third database 551 with the combined database 155 obtained by combining the processed database FP2 with the first database 151 (S150).

FIG. 11 illustrates an example of the extended combined database 155. In the extended combined database 155, features of each consumer are indicated by many parameters. The second group and the third group include consumers that are common between the second group and the third group and that are not common with the first group. The pieces of statistic data FS2 and FS3 about these consumers are combined in the extended combined database 155. Thus, the extended combined database 155 is extremely useful for analyzing consumer behavior.

Third Embodiment

Next, a third embodiment will be described. A data processing system 1 according to the third embodiment corresponds to a modification of the data processing system 1 according to the first embodiment. Hereinafter, description on components of the data processing system 1 according to the third embodiment that are the same as those in the first embodiment will be omitted as appropriate.

In the third embodiment, to consumers in the first group, identification codes (hereinafter, referred as first identification codes) that are the same as that assigned in the first embodiment are assigned, whereas to consumers in the second group, second identification codes different from the first identification codes are assigned. Thus, pieces of second individual feature data F4 in a range indicated by a sign C in a second database 351 according to the present embodiment illustrated in FIG. 12A include data about consumers that are the same as those corresponding to the pieces of first individual feature data F1 indicated by the sign C in FIG. 2A, but have no identification codes that are the same as that in the first group. There is a certain rule between the second identification codes illustrated in FIG. 12A and the first identification codes illustrated in FIG. 2A. However, this is merely for making the association between the codes easier to understand. It should be noted that there is no rule between the first identification codes and the second identification codes in actual cases.

Thus, in the present embodiment, an association table TB1 indicating the association between the first identification codes and the second identification codes is prepared. Based on this association table TB1, the common consumers between the first group and the second group are identified. FIG. 13 illustrates an example of the association table TB1 configured to have a second identification code provided for each first identification code.

The combination system 10 can acquire the association table TB1 from an external system, for example. For example, when the first identification codes and the second identification codes are user IDs for different websites or online stores, these user IDs are linked through terminal IDs or cookie IDs of user terminal devices using the websites. The external system can monitor a wide area network (the Internet) to which user terminal devices are connected, and generate the association table TB1 based on the terminal IDs and/or the cookie IDs. Alternatively, the association table TB1 may be obtained from a company that provides an ID linkage service.

Figure 3:
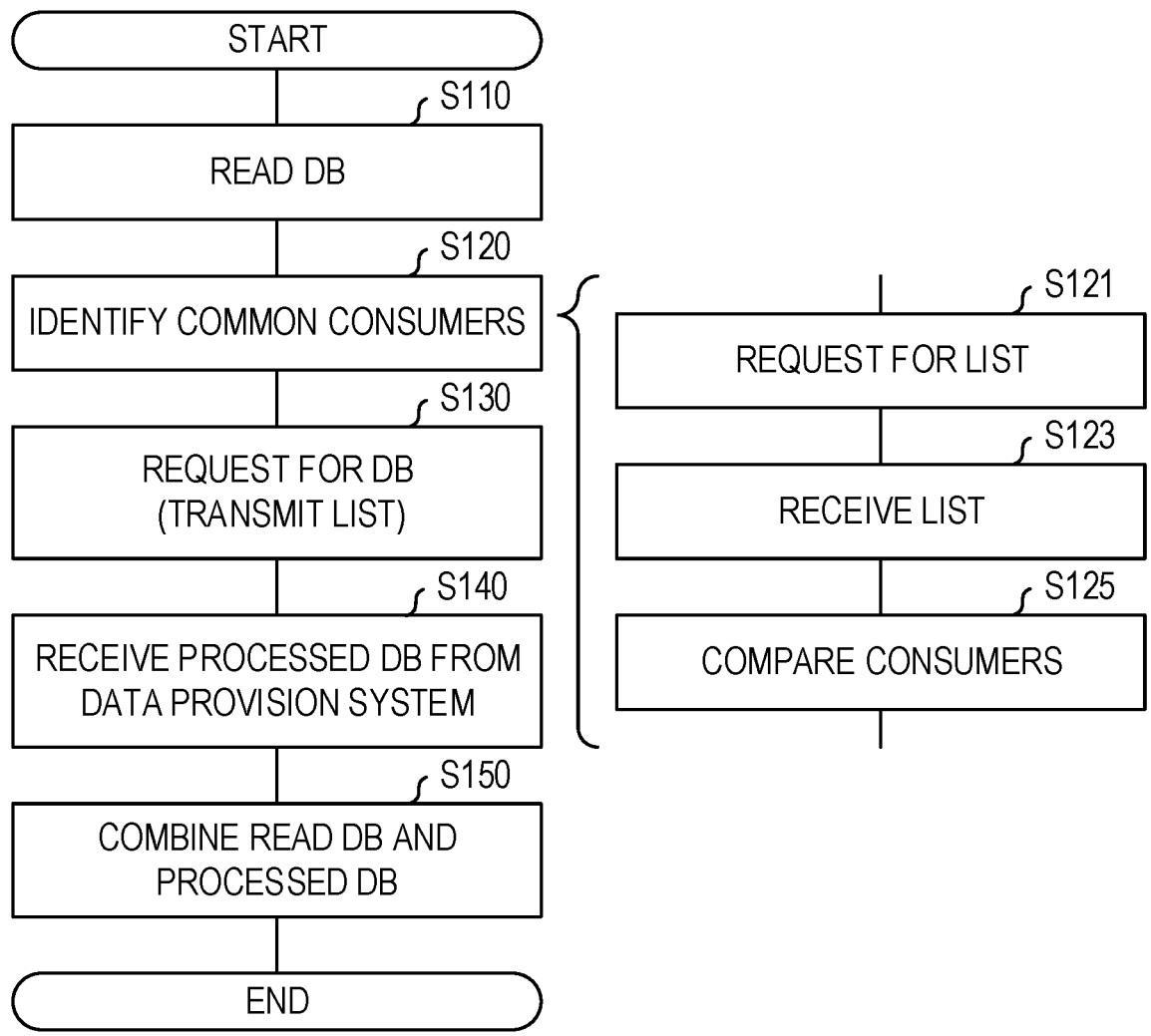
FIG. 3 is a flowchart of a process performed by a combination system.

In the present embodiment, the processor 11 of the combination system 10 performs the process illustrated in FIG. 3. In step S120, the processor 11 can identify the common consumers between the first group and the second group based on the association table TB1 acquired from the external system as described above. The processor 11 can store the acquired association table TB1 in the memory 13 or the storage device 15.

The processor 11 can transmit a database request signal with the list of the second identification codes of the common consumers to the data provision system 30 (S130). Thus, the data provision system 30 can identify the common consumers between the first group and the second group based on the second identification codes in the list (S230).

Then, the data provision system 30 clusters the identified common consumers (S240), and can generate and transmit a processed database FP4 including a piece of cluster feature data FC4 associated with the second identification codes for each cluster as illustrated in FIG. 12B (S250 and S280). The processed database FP4 is different from the processed database FP2 according to the first embodiment in that the pieces of cluster feature data about non-common consumers is not included in the processed database FP4.

Upon acquiring the processed database FP4 from the data provision system 30 (S140), the processor 11 of the combination system 10 generates the combined database 155 with reference to the association table TB1. Specifically, with reference to the association table TB1, the combined database 155 is generated by combining each piece of first individual feature data F1 with the statistic data FS4 of the corresponding piece of cluster feature data FC4 associated with the second identification code corresponding to the first identification code of the piece of first individual feature data F1.

FIG. 14 illustrates the combined database 155 generated in the present embodiment. This combined database 155 has no cluster feature data about non-common consumers. This configuration of the combined database 155 may be applied to the first and the second embodiments. In such a case, the data provision systems 30 and 50 according to the first embodiment and the second embodiment may be configured not to provide cluster feature data about the non-common consumers to the combination system 10.

According to the third embodiment, the effective combined database 155 can be generated by appropriately combining the piece of first individual feature data F1 and the piece of cluster feature data FC4 of the same consumer, even when the identification codes used are different between the first group and the second group.

Fourth Embodiment

Next, a fourth embodiment will be described. A data processing system 1 according to the fourth embodiment corresponds to a modification of the data processing system 1 according to the first embodiment. Hereinafter, description on components of the data processing system 1 according to the fourth embodiment that are the same as those in the first embodiment will be omitted as appropriate.

Figure 15:
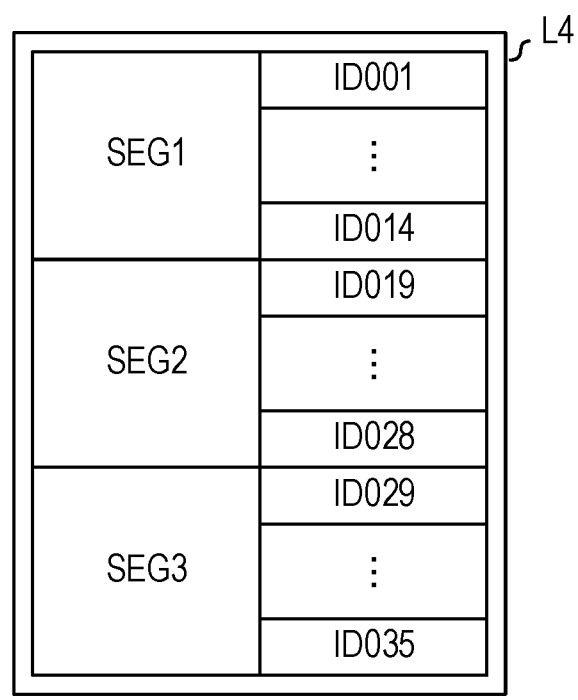
FIG. 15 is a diagram showing a configuration of a list of common consumers with segment information.

According to the fourth embodiment, the processor 11 of the combination system 10 transmits a database request signal to which a common consumer list L4 illustrated in FIG. 15 is attached, to the data provision system 30 in S130. The list L4 illustrated in FIG. 15 has segment information indicating a segment to which each common consumer belong. The segment information corresponds to classification information indicating a classification of each common consumer. Specifically, the list L4 has a configuration in which each segment is provided with the identification codes of the common consumers belonging to the segment.

In FIG. 15, a first segment (SEG1), a second segment (SEG2), and a third segment (SEG3) are defined in the list L4, and are each provided with identification codes of common consumers belonging to the segment.

The segment information is used by the combination system 10 to perform control on clustering in the data provision system 30. The control on the clustering mentioned here includes controlling the clustering in the data provision system 30 so that one cluster does not include consumers belonging to different segments.

In S130, the processor 11 can classify the common consumers in the first group into a plurality of segments based on a predetermined rule. For example, if the gender of the common consumer can be determined by referring to the first individual feature data F1, the processor 11 can define a male segment and a female segment in the list L4, so that one cluster would not include consumers different from each other in gender. Specifically, in S130, the processor 11 can generate a list L4 describing, for each segment, identification codes of common consumers of the corresponding gender, and transmit the list L4 to the data provision system 30.

Alternatively, if the residential area of the common consumer can be determined by referring to the first individual feature data F1, the processor 11 can define a segment for each residential area, so that one cluster would not include consumers different from each other in their residential areas. Specifically, in S130, the processor 11 can generate a list L4 describing, for each segment, identification codes of common consumers of the corresponding residential area, and transmit the list L4 to the data provision system 30. In order to protect the consumer's personal information, the list L4 may be generated so as not to include the details of the segment, that is, not to include information enabling identification of the specific attributes (gender and residential area) of the consumers in the segment.

Figure 16:
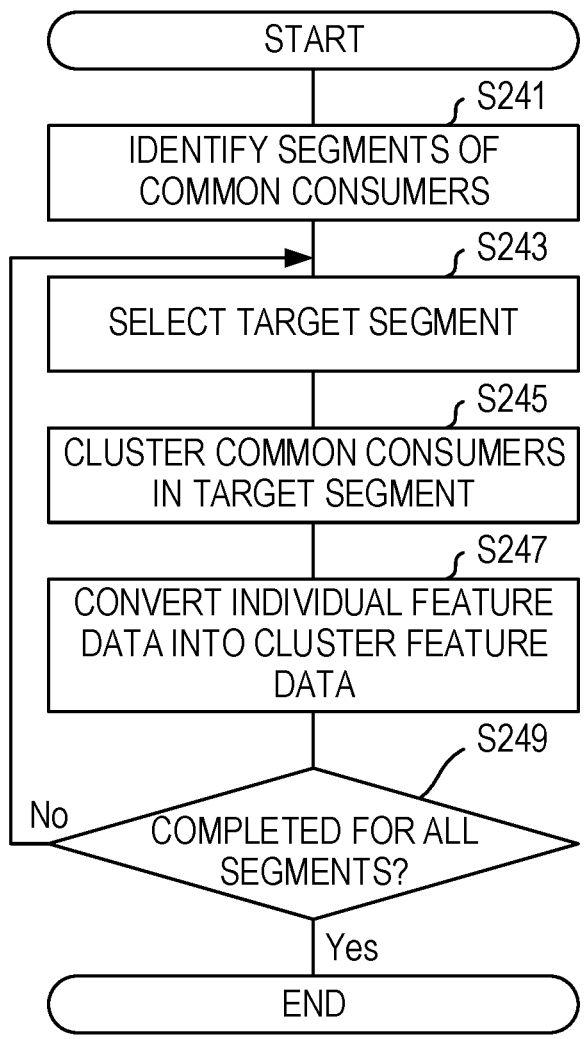
FIG. 16 is a flowchart of a process performed by a data provision system according to a fourth embodiment.

The processor 31 of the data provision system 30 that has received the list L4 of the common consumers with the segment information can perform the process illustrated in FIG. 16 instead of the processes in S240 and S250 illustrated in FIG. 4. In the process illustrated in FIG. 16, the common consumers are clustered into a plurality of clusters for each segment based on the list L4.

According to an example illustrated in FIG. 16, the processor 31 first identifies, based on the received list L4, the segment to which each common consumer in the second group belongs (S241). Thereafter, one of the segments is selected as a process target segment (S243), and the common consumers belonging to the selected process target segment are clustered into a plurality of clusters (S245). After the process in S245, the processor 31 generates one piece of cluster feature data FC2 for each of the clusters in the process target segment based on the pieces of second individual feature data F2 about the consumers belonging to the corresponding cluster (S247).

After that, the processor 31 determines whether the processes of S245 and S247 have been completed for all the segments (S249). If it is determined that the processes has not been completed for all the segments (No in S249), the processor 31 selects one of the unselected segments to be a new process target segment (S243), and performs the processes in S245 and S247. When it is determined that the processes has been completed for all the segments (Yes in S249), the process illustrated in FIG. 16 ends.

According to the present embodiment, the combination system 10 can perform control on the clustering of the data provision system 30 so that the desired information would not be lost when the cluster feature data FC2 is generated by effectively utilizing the information of the first database 151.

Therefore, it is possible to generate the combined database 155 more suitable for data analysis.

The present embodiment includes a concept that the combination system 10 controls the clustering of the data provision system 30 and a concept that the data provision system 30 clusters a plurality of consumers according to the constraint conditions designated by the combination system 10.

Thus, as a further modification, the combination system 10 may be configured to transmit a database request signal requesting for clustering based on gender and clustering based on residential area, without providing segment information. In this case, the processor 31 of the data provision system 30 can determine the segments (gender or residential area) of the common consumers and the non-common consumers based on the second individual feature data F2 of the second database 351 and perform clustering for each segment in response to the request from the combination system 10.

Fifth Embodiment

Next, a fifth embodiment will be described. A data processing system 1 according to the fifth embodiment corresponds to a modification of the data processing system 1 according to the first embodiment. Hereinafter, description on components of the data processing system 1 according to the fifth embodiment that are the same as those in the first embodiment will be omitted as appropriate.

Figure 17:
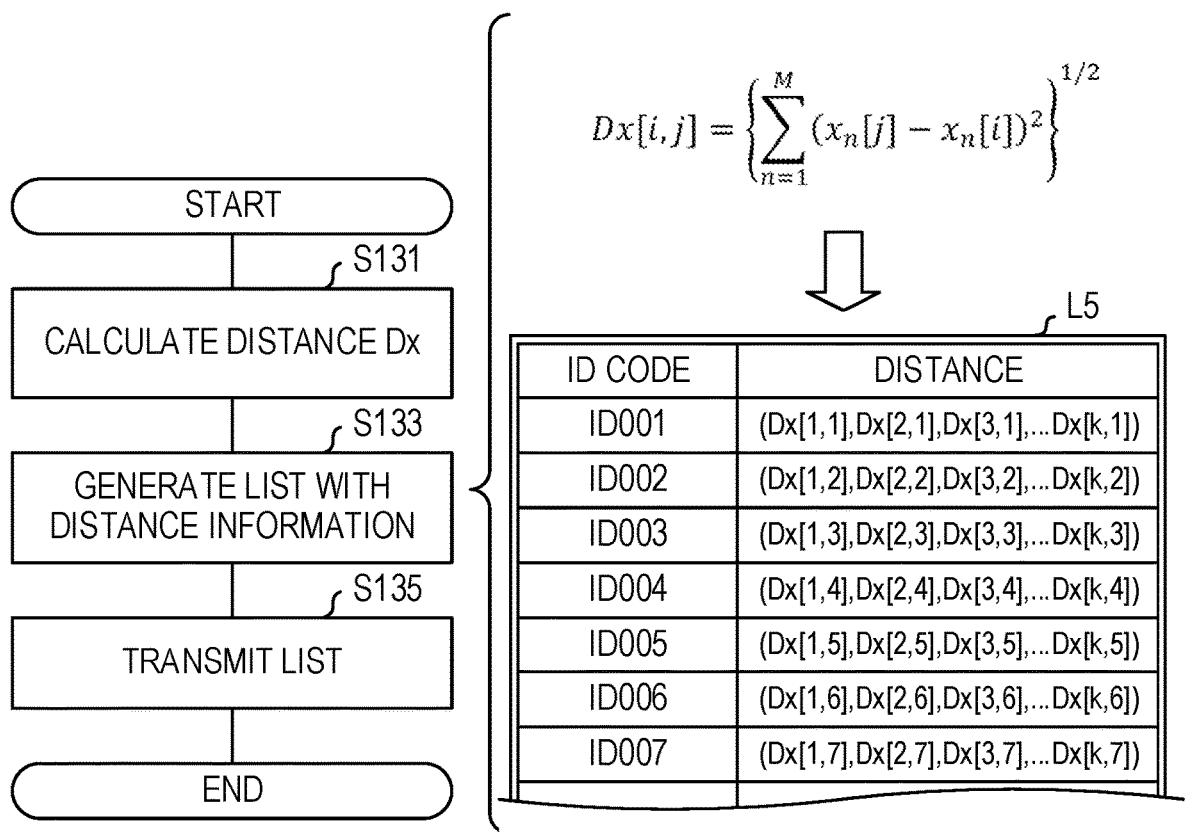
FIG. 17 is a flowchart of a process performed by a combination system according to a fifth embodiment.

According to the fifth embodiment, the processor 11 of the combination system 10 performs a process illustrated in FIG. 17 in S130. Thus, the processor 11 transmits a database request signal to which a list L5 of common consumers including distance information is attached, to the data provision system 30.

Specifically, the processor 11 calculates distances $Dx[i,j]$ in the feature space between the common consumers by referring to the first individual feature data F1 in the first database 151 (S131). Each distance $Dx[i,j]$ indicates a distance between the consumer i and the consumer j based on the first individual feature data F1. This distance corresponds to a similarity in feature between the consumer i and the consumer j.

The processor 11 can calculate the distances $Dx[i,j]$ between the common consumers in the feature space using the Euclidean distance. The distance $Dx[i,j]$ between the consumer i and the consumer j can be calculated with the following equation.

$$Dx[i,j]=\{\Sigma(xn[i]-xn[j])^2\}^{1/2}$$

where $\Sigma(xn[i]-xn[j])^2$ is the sum total of $(xn[i]-xn[j])^2$ from n=1 to n=M. The value M corresponds to the number of parameters X1, X2, X3 defining features of a consumer in a piece of first individual feature data F1. According to FIG. 2A, M=3. In the equation, $xn[i]$ is the value of the parameter Xn of the consumer i. In the equation, $xn[j]$ is the value of the parameter Xn of the consumer j. In S131, the distances $Dx[i,j]$ are calculated for all combinations of the consumer i and the consumer j corresponding to the common consumers.

Then, the processor 11 generates the list L5 of common consumers with distance information (S133). In the list L5, information about the distances $Dx[i,j]$ calculated in S131 is added to the identification codes of the common consumers. According to the example illustrated in FIG. 17, in the list L5, the identification code of the consumer j is associated with the distance $Dx[i,j]$ for each combination with any consumer i.

The processor 11 transmits the list L5 of common consumers with the distance information thus generated in S133 to the data provision system 30 (S135).

Figure 18:
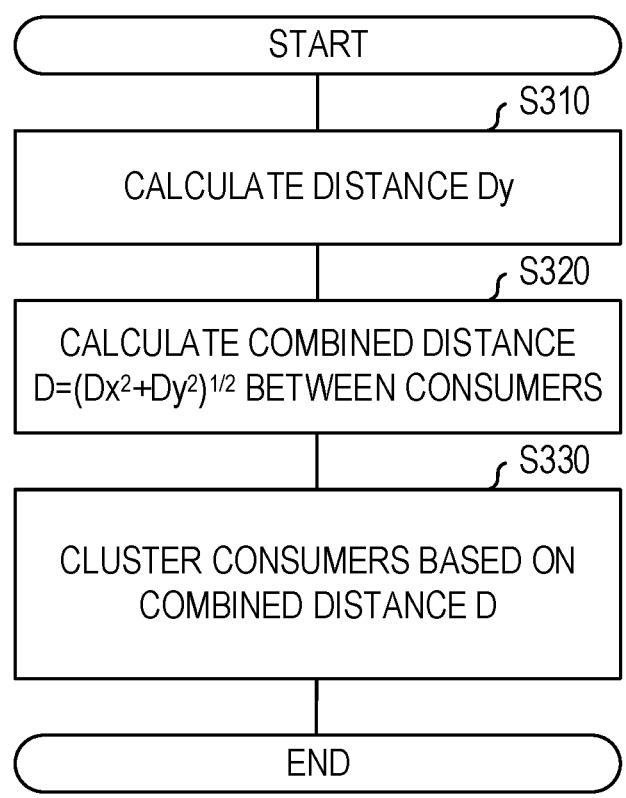
FIG. 18 is a flowchart of a process performed by a data provision system according to the fifth embodiment.

On the other hand, the processor 31 of the data provision system 30 that has receives the list L5 with distance information can perform a process illustrated in FIG. 18 in S240. Specifically, the processor 31 calculates the distances $Dy[i,j]$ between the consumers as clustering targets (that is, between the common consumers) based on the second individual feature data F2. The distances $Dy[i,j]$ can be calculated by a method similar to that described in the first embodiment (S310).

Then, the processor 31 calculates combined distances $D[i,j]$ between consumers according to the following equation (S320). Each combined distance $D[i,j]$ is a combined distance between the consumer i and the consumer j.

$$D[i,j]=(Dx[i,j]^2+Dy[i,j]^2)^{1/2}$$

After the processing in S320, the processor 31 clusters the consumers as the clustering targets into a plurality of clusters, based on the distribution of the consumers as the clustering target identified by the combined distances $D[i,j]$, so that consumers with close combined distances $D[i,j]$ are clustered into one cluster (S330).

According to the fifth embodiment, the combination system 10 provides information about the distances (that is, similarity information) between the common consumers based on the first database 151 to the data provision system 30, so that better clustering can be performed in the data provision system 30, while keeping the personal information in the first database 151 confident. Thus, the combined database 155 having higher information value can be generated while protecting personal information.

Sixth Embodiment

Subsequently, a sixth embodiment will be described. A data processing system 1 according to the sixth embodiment corresponds to a modification of the data processing system 1 according to the first embodiment. Hereinafter, description on components of the data processing system 1 according to the sixth embodiment that are the same as those in the first embodiment will be omitted as appropriate.

According to the sixth embodiment, the processor 11 of the combination system 10 is configured to cluster common consumers into a plurality of clusters and to provide cluster information to the data provision system 30. Thus, the sixth embodiment is different from the first embodiment in that the entity that clusters the common consumers is changed from the data provision system 30 to the combination system 10.

Figure 19:
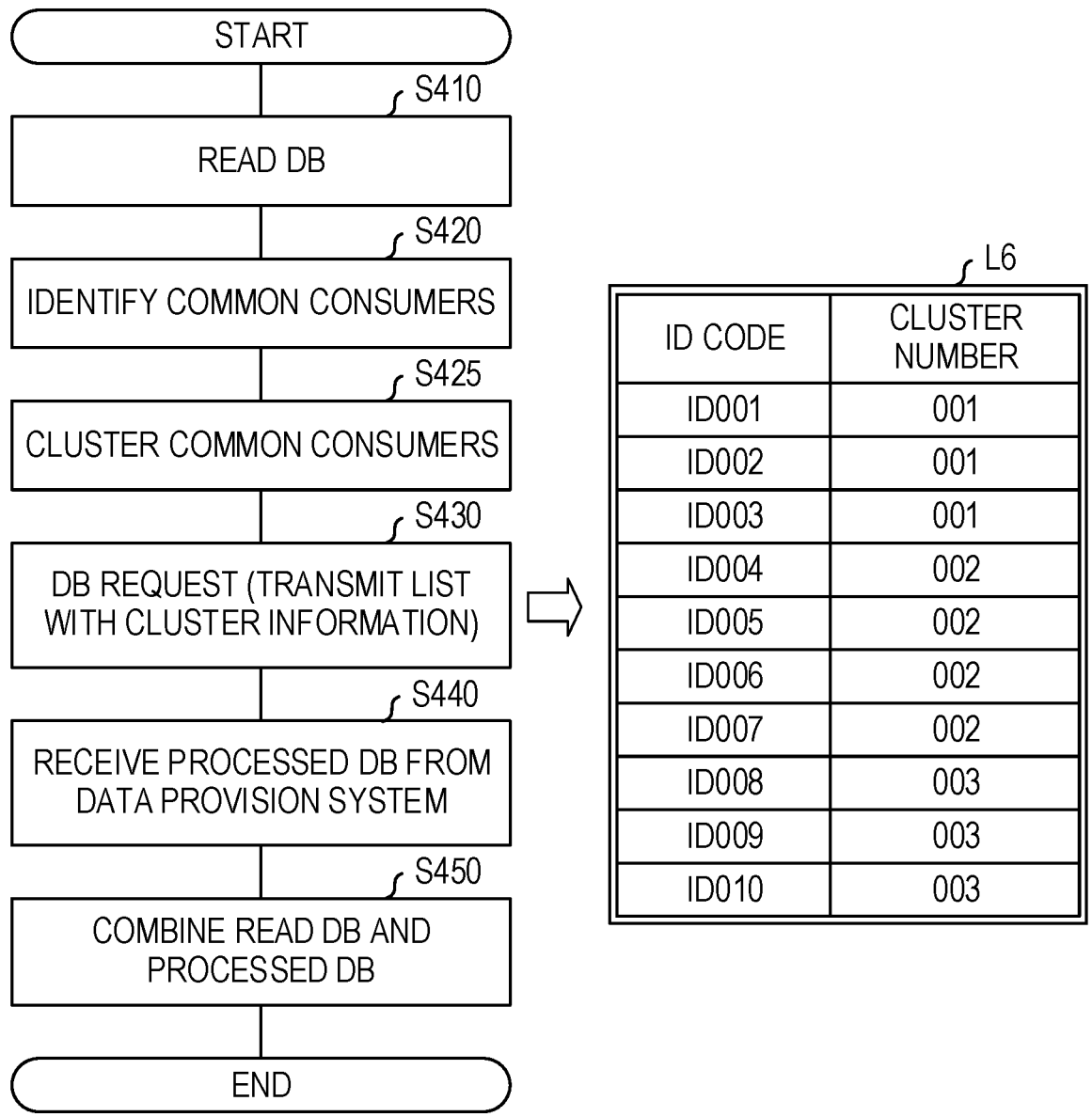
FIG. 19 is a flowchart of a process performed by a combination system according to a sixth embodiment.

Specifically, the combination system 10 in the present embodiment is configured such that the processor 11 performs a combined database generation process illustrated in FIG. 19 instead of the process illustrated in FIG. 3. The data provision system 30 is configured so that the processor 31 performs the processes from S530 to S580 illustrated in FIG. 20 instead of the processes from S230 to S280 illustrated in FIG. 4.

Upon starting the process illustrated in FIG. 19, the processor 11 of the combination system 10 reads the first database 151 from the storage device 15 as in the process in S110 (S410). Furthermore, as in the process in S120, common consumers between groups are identified (S420).

Thereafter, the processor 11 clusters the common consumers into a plurality of clusters based on the pieces of first individual feature data F1 about the common consumers (S425). Here, the common consumers can be clustered as in the process in S240, but with the first individual feature data F1 used instead of the second individual feature data F2.

After the process in S425, the processor 11 transmits a database request signal with a list L6 of the second identification codes of the common consumers, including the cluster information, to the data provision system 30 (S430). The cluster information is configured to enable the data provision system 30 to identify the cluster to which each of the common consumers belongs. For example, as illustrated in FIG. 19, the list L6 is configured to have a cluster number that is an identification code of a cluster to which the corresponding consumer belongs, in association with the second identification code of each common consumer.

Figure 20:
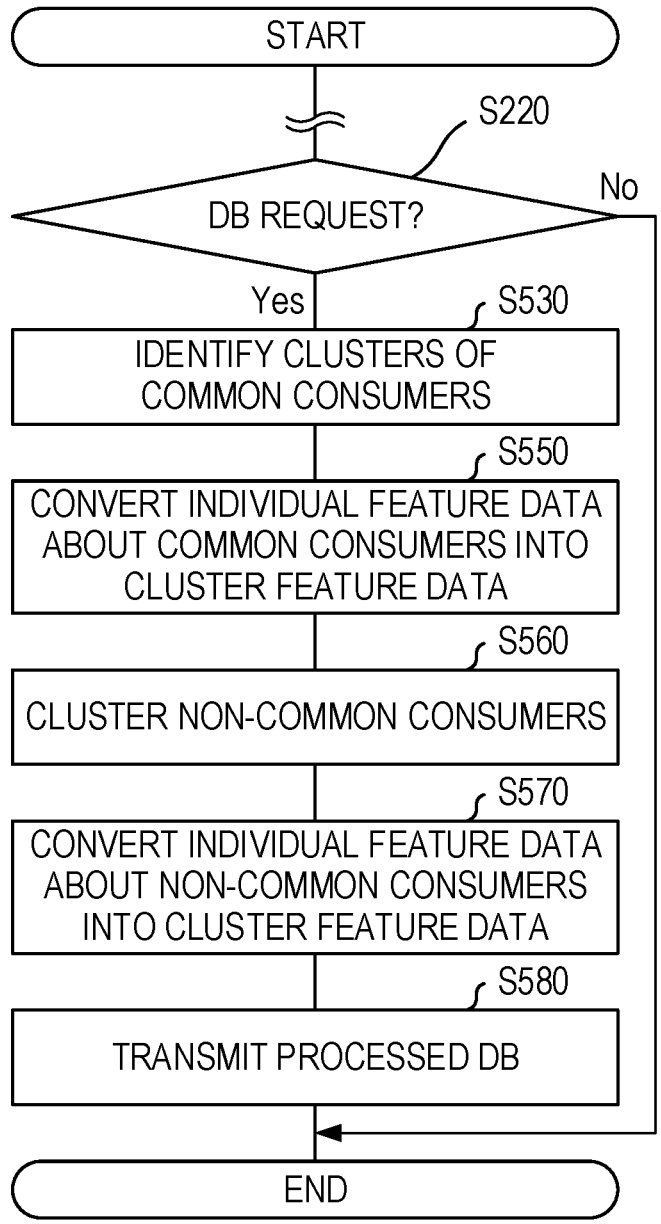
FIG. 20 is a flowchart of a process performed by a data provision system according to a sixth embodiment.

Upon receiving the database request signal (Yes in S220), the processor 31 of the data provision system 30 identifies the cluster to which each common consumer belongs, based on the cluster information included in the list, and identifies the piece of second individual feature data F2 of each common consumer based on the second identification code included in the list as illustrated in FIG. 20 (S530).

Then, the processor 31 generates one piece of cluster feature data FC2 for each of the clusters identified from the cluster information by integrating the pieces of second individual feature data F2 about consumers belonging to the corresponding cluster (S550). In S550, a process similar to that performed in S250 in the first embodiment may be performed.

After finishing the process in S550, the processor 31 performs the processes as in S260 and S270 in the first embodiment in S560 and S570, to generate one piece of cluster feature data FC2 for each cluster related to the non-common consumers.

Thereafter, the processor 31 transmits the pieces of cluster feature data FC2 about the common consumers and the non-common consumers generated in S550 and S570 to the combination system 10 as the processed database FP2 (S580).

The processor 11 of the combination system 10 receives the processed database FP2 thus transmitted from the data provision system 30 (S440), and generates the combined database 155 (S450). In S440 and S450, the processor 11 can the processes as in S140 and S150 in the first embodiment.

Also in the sixth embodiment, the combined database 155 as in the first embodiment can be generated. As can be understood from the sixth embodiment, the clustering of the common consumers can be performed by the combination system 10 or the data provision system 30. In this context, the technical idea of the fifth embodiment that the combination system 10 provides the distance information to the data provision system 30 is applicable to the sixth embodiment, in a mode where the data provision system 30 provides the distance information to the combination system 10.

In this mode, the processor 31 of the data provision system 30 can generate the distance information about the common consumers and the non-common consumers based on the pieces of second individual feature data F2 of the second database 351, and provided the distance information generated to the combination system 10. The processor 11 of the combination system 10 can use this distance information to cluster common consumers into a plurality of clusters. In this case, the processor 11 may further cluster the non-common consumers using the distance information.

Seventh Embodiment

Next, a seventh embodiment will be described. A data processing system 1 according to the seventh embodiment corresponds to a modification of the data processing system 1 according to the sixth embodiment. Hereinafter, description on components of the data processing system 1 according to the seventh embodiment that are the same as those in the sixth embodiment will be omitted as appropriate.

Figures 21A, 21B:
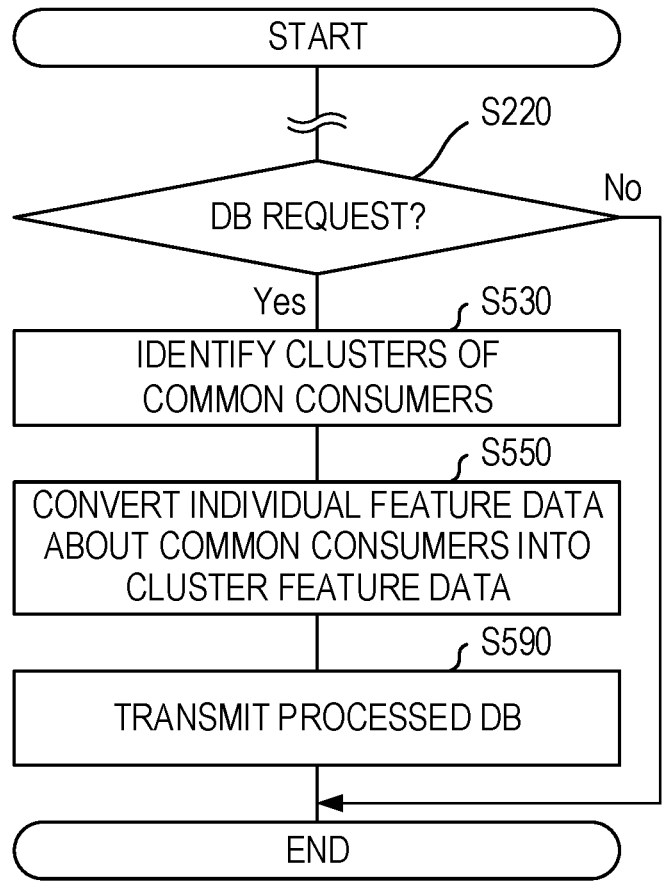
FIG. 21A is a flowchart of a process performed by a data provision system according to a seventh embodiment.
FIG. 21B is a diagram showing a configuration of cluster feature data according to the seventh embodiment.

In the present embodiment, the processor 31 of the data provision system 30 is configured to perform the processes from S530, S550, and S590 illustrated in FIG. 21A instead of the processes from S530 to S580 illustrated in FIG. 20.

Upon receiving the database request signal (Yes in S220), the processor 31 performs the processes in S530 and S550 as in the sixth embodiment, to generate, for each of clusters related to the common consumers, one piece of cluster feature data FC6 by integrating the pieces of second individual feature data F2 about consumers belonging to the corresponding cluster. As illustrated in FIG. 21B, the piece of cluster feature data FC6 thus generated includes a cluster number of the corresponding cluster associated with the statistic data FS2 which has statistics indicating features of the consumers belonging to the cluster.

Then, the processor 31 proceeds to S590 without generating cluster feature data related to non-common consumers, and transmits the pieces of cluster feature data FC6 generated in S550 to the combination system 10 as the processed database FP6 as illustrated in FIG. 21B.

Figure 22:
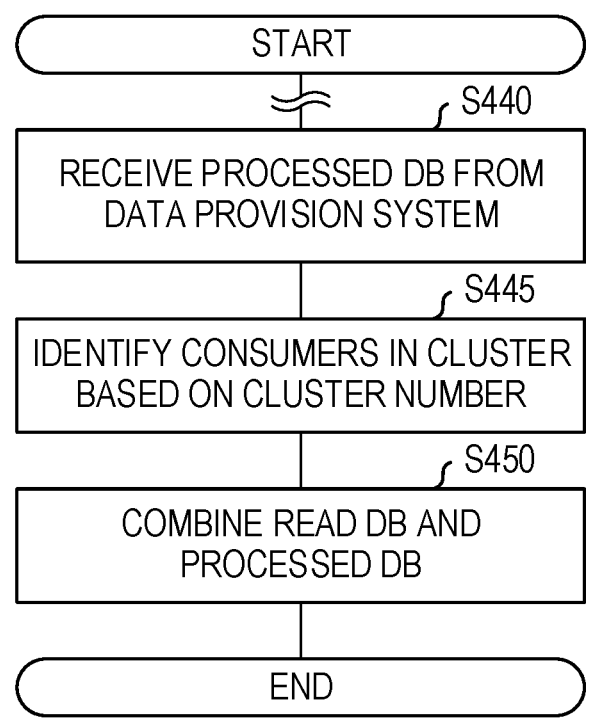
FIG. 22 is a flowchart of a process performed by a combination system according to the seventh embodiment.

The processor 11 of the combination system 10 is configured to perform the processes in S440, S445, and S450 illustrated in FIG. 22 instead of the processes of S440 and S450 illustrated in FIG. 19.

Specifically, the processor 11 that has received the processed database FP6 (S440) determines, for each piece of cluster feature data FC6 in the processed database FP6, the identification codes of common consumers belonging to the corresponding cluster, based on the cluster number included in the corresponding piece of cluster feature data FC6 (S445).

The processor 11 of the combination system 10 can temporarily store the list L6, transmitted in S430, in the memory 13. The processor 11 can determine the identification codes of the common consumers belonging to the cluster corresponding to each piece of cluster feature data FC6, by referring to the temporarily stored list L6 in S440.

Based on the identification codes of common consumers corresponding to each piece of cluster feature data FC6 thus determined, the processor 11 generates the combined database 155 by combining the pieces of first individual feature data F1 and the pieces of cluster feature data FC6, with the piece of first individual feature data F1 and the statistic data FS2 of the piece of cluster feature data FC6 with the same identification code combined. FIG. 14 illustrates an example of the combined database 155 thus generated.

Eighth Embodiment

Next, an eighth embodiment will be described. A data processing system 1 according to the eighth embodiment corresponds to a modification of the data processing system 1 according to the seventh embodiment. Hereinafter, description on components of the data processing system 1 according to the eighth embodiment that are the same as those in the seventh embodiment will be omitted as appropriate.

Figure 23:
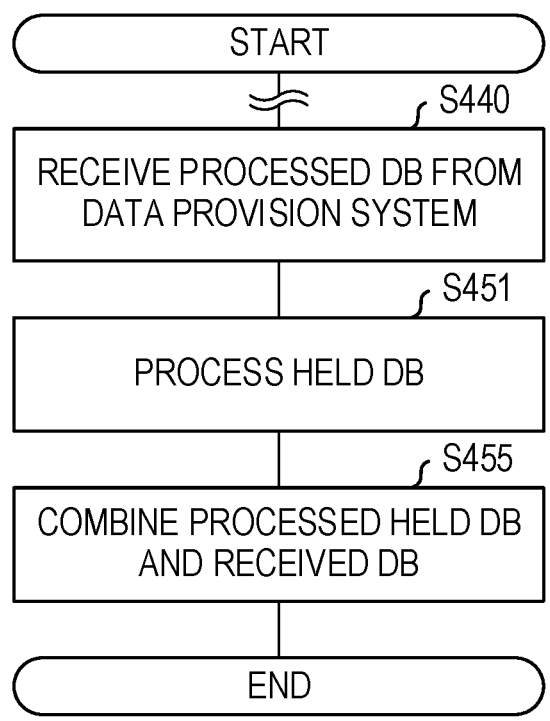
FIG. 23 is a flowchart of a process performed by a combination system according to an eighth embodiment.

In the present embodiment, the processor 11 of the combination system 10 is configured to perform the processes in S451 and S455 illustrated in FIG. 23 instead of the processes in S445 and S450 in FIG. 22.

Specifically, upon receiving the processed database FP6 (S440), the processor 11 reads the pieces of first individual feature data F1 about the common consumers in the first database 151 stored in the storage device 15, and generates one piece of cluster feature data FC1 for each of clusters by integrating the pieces of first individual feature data F1 about the common consumers belonging to the corresponding cluster (S451).

The clusters correspond to a plurality of clusters defined in the list L6 (FIG. 19) transmitted in S430. Specifically, for each of the clusters that are the same as those in the processed database FP6, the processor 11 converts the values of the parameters X1, X2, and X3 indicated by the pieces of first individual feature data F1 about the common consumers in the corresponding cluster into one statistic ST for each parameter, and generates one piece of cluster feature data FC1 corresponding to this cluster. Data surrounded by a broken line in FIG. 24 is an example of one piece of cluster feature data FC1. The piece of cluster feature data FC1 includes the cluster number of the corresponding cluster.

After finishing the process in S451, the processor 11 generates a combined database 156 illustrated in FIG. 24 which replaces the combined database 155, by combining pieces of cluster feature data FC1 and pieces of cluster feature data FC6, with the statistic data FS2 of the piece of cluster feature data FC6 combined with the piece of cluster feature data FC1 with the same cluster number.

In the present embodiment, for the first group and the second group, the combined database 156 is generated by combining pieces of statistic data generated from the pieces of individual feature data F1, F2 of the same cluster. Thus, with the present embodiment, statistics of the personal information held by a plurality of databases can be obtained, and the pieces of statistic data can be appropriately combined.

Furthermore, the combined database 156 does not include the personal information of the first database 151 and the second database 351. Therefore, according to the present embodiment, it is possible to generate the combined database 156 that is meaningful for provision to a third party.

Ninth Embodiment

Figure 25:
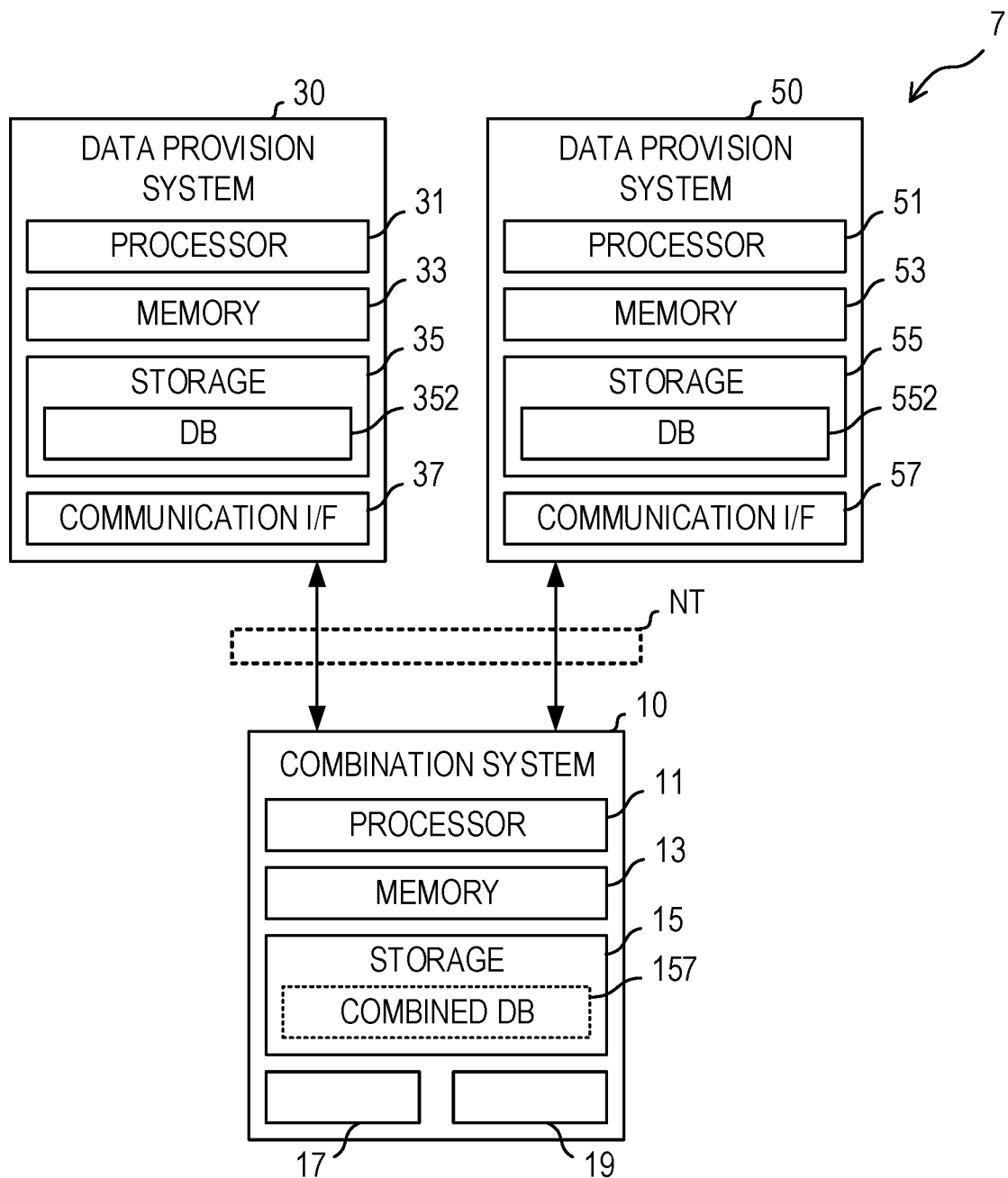
FIG. 25 is a block diagram showing a configuration of an information processing system according to a ninth embodiment.

Next, a data processing system 7 according to a ninth embodiment will be described. The data processing system 7 according to the ninth embodiment includes a combination system 10, a first data provision system 30, and a second data provision system 50 as illustrated in FIG. 25.

The hardware configuration of the combination system 10, the first data provision system 30, and the second data provision system 50 according to the ninth embodiment is the same as those in the data processing systems 1 and 2 according to the first and second embodiments. Thus, the description of the hardware configuration will be omitted below.

In the first and second embodiments, the combination system 10 generates the combined database 155 by combining the first database 151 of the combination system 10 and the processed database FP2 based on the second database 351 of the data provision system 30.

In the ninth embodiment, the combination system 10 does not include the first database 151. The first data provision system 30 stores the first database 352 in the storage device 35 instead of the second database 351, and the second data provision system 50 stores the second database 552 in the storage device 55 instead of the third database 551.

The combination system 10 generates a combined database 157 by combining a processed database FP71 based on the first database 352 provided from the first data provision system 30 with a processed database FP72 based on the second database 552 provided from the second data provision system 50, and store the combined database 157 in the storage device 15.

A step of generating the combined database 157 includes: a step of processing data in the first database 352 by the first data provision system 30; and a step of processing data in the second database 552 by the second data provision system 50. The steps of processing include integrating data related to individuals, in the first database 352 and the second database 552, so that the data related to individuals is converted into data related to clusters.

The combination system 10 provides the first data provision system 30 and the second data provision system 50 with first cluster information CD1 and second cluster information CD2 for controlling the processing steps.

Figure 26:
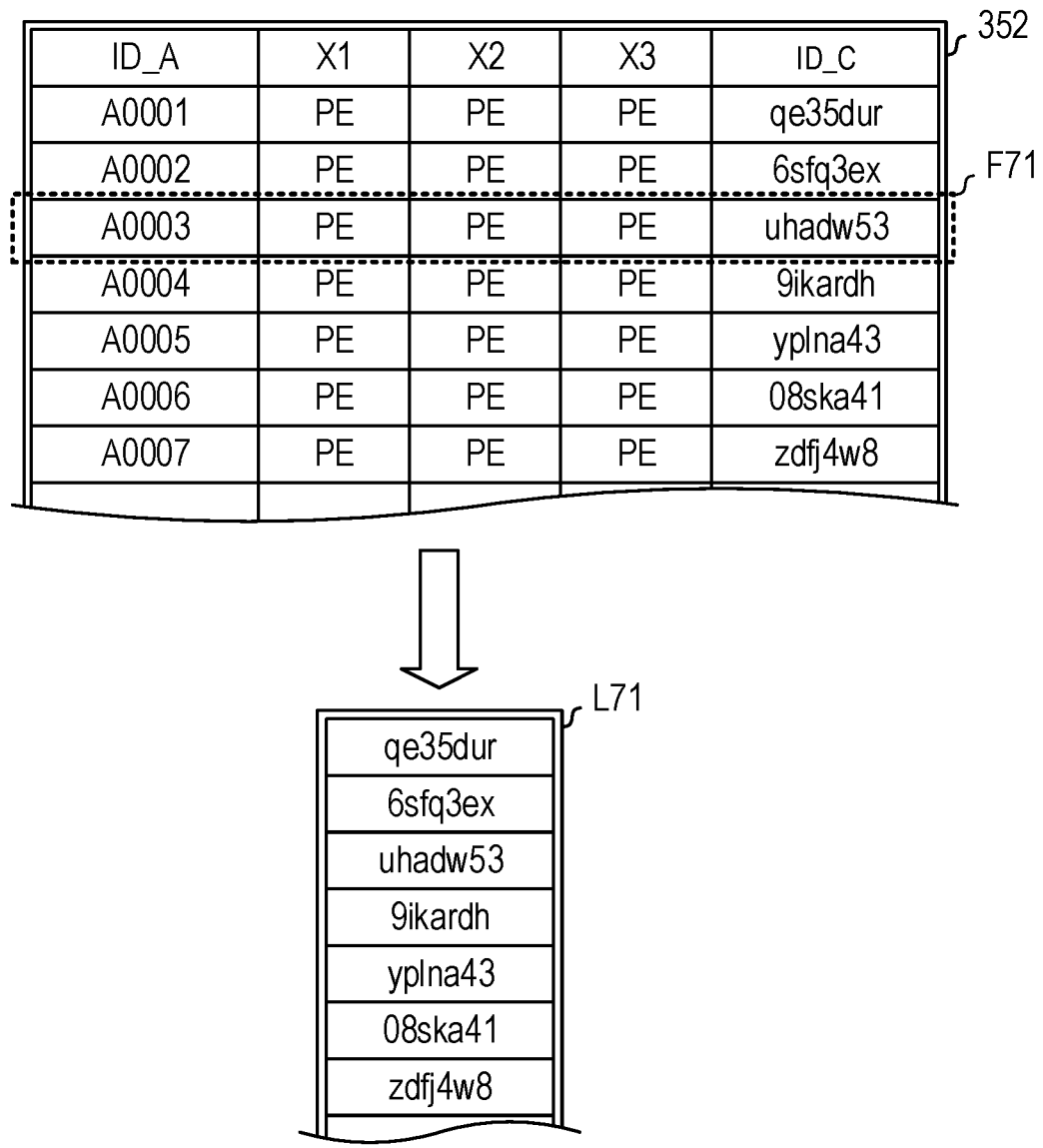
FIG. 26 is a diagram showing a configuration of a first database and a consumer list.

The first database 352 illustrated in FIG. 26 includes, for each consumer in the first group, one piece of individual feature data F71 (first individual feature data F71) about the corresponding consumer, as in the case of the first database 151 according to the first embodiment.

Figure 27:
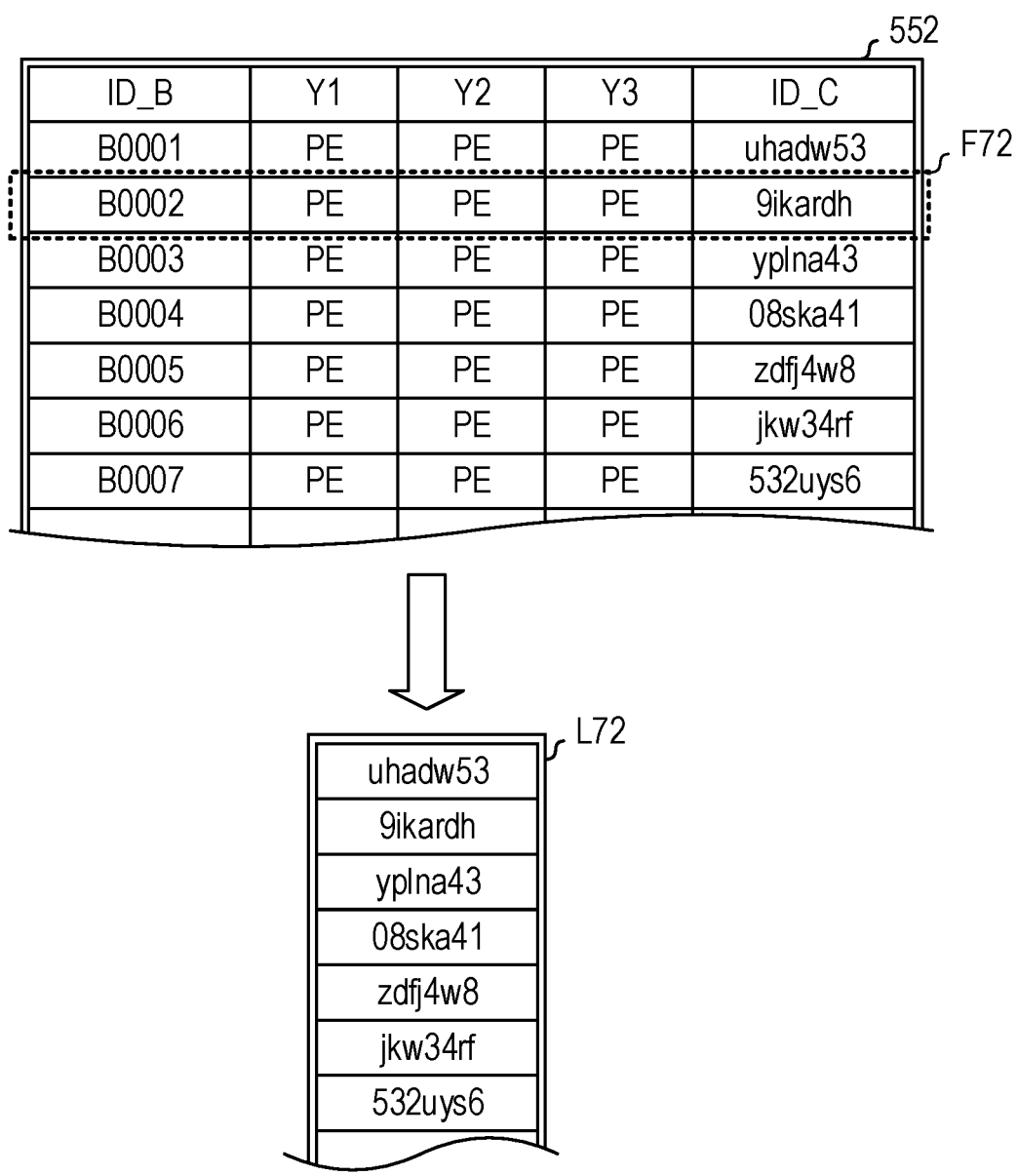
FIG. 27 is a diagram showing a configuration of a second database and a consumer list.

The second database 552 illustrated in FIG. 27 includes, for each consumer in the second group, one piece of individual feature data F72 (second individual feature data F72) about the corresponding consumer as in the case of the second database 351 according to the first embodiment.

As can be seen in the upper section of FIG. 26, each piece of first individual feature data F71 included in the first database 352 has features of one corresponding consumer associated with a consumer number ID_A and a link identifier ID_C of the consumer. Specifically, each piece of first individual feature data F71 indicates features of the corresponding consumer using a plurality of parameters X1, X2, and X3, as in the first embodiment.

The consumer number ID_A and the link identifier ID_C are both identification codes unique to the corresponding consumer, but the consumer number ID_A is an identification code dedicated to the first group and thus is not used in the second database 552. On the other hand, the link identifier ID_C is an identification code common to the first group and the second group and is used in the first database 352 and the second database 552.

As can be seen in the upper section of FIG. 27, each piece of second individual feature data F72 included in the second database 552 has features of one corresponding consumer associated with a consumer number ID_B and a link identifier ID_C which are unique to the consumer. Specifically, each piece of second individual feature data F72 indicates features of the corresponding consumer using a plurality of parameters Y1, Y2, and Y3, as in the first embodiment.

The consumer number ID_B is an identification code dedicated to the second group and thus is not used in the first database 352. The link identifier ID_C is an identification code common to the first group and the second group as described above. Thus, in the second database 552, the link identifier ID_C with the same value as that in the first database 352 is associated with the piece of feature data about the same consumer as the first database 352.

According to the examples illustrated in the upper section of FIG. 26 and the upper section of FIG. 27, the consumers corresponding to the pieces of first individual feature data F71 associated with A0003, A0004, A0005, A0006, and A0007 as their consumer numbers ID_A in the first database 352, are the same as consumers corresponding to the pieces of second individual feature data F72 associated with B0001, B0002, B0003, B0004, and B0005 as their consumer numbers ID_B in the second database 552.

The link identifier ID_C may be, for example, an identification code of a consumer in a third group having a larger number of consumers than the first and second groups. The link identifier ID_C may be an identification code (e.g., terminal ID) of a communication device such as a smartphone owned by the consumer, or a consumer identification code (e.g., a cookie ID) used for tracking consumers on a network.

The link identifier ID_C may be a value obtained by concealing, specifically, hashing the identification code. The hashing can be performed with the same hash function used in the first data provision system 30 and the second data provision system 50, so that the same value of the link identifier ID_C is obtained for the same consumer. Furthermore, some of the consumers in the first group and some of the consumers in the second group may not have the link identifier ID_C. In this case, information indicating that the link identifier is unknown is associated with the pieces of first and second individual feature data F71 and F72 about such consumers, in the first database 352 and the second database 552.

Figure 28:
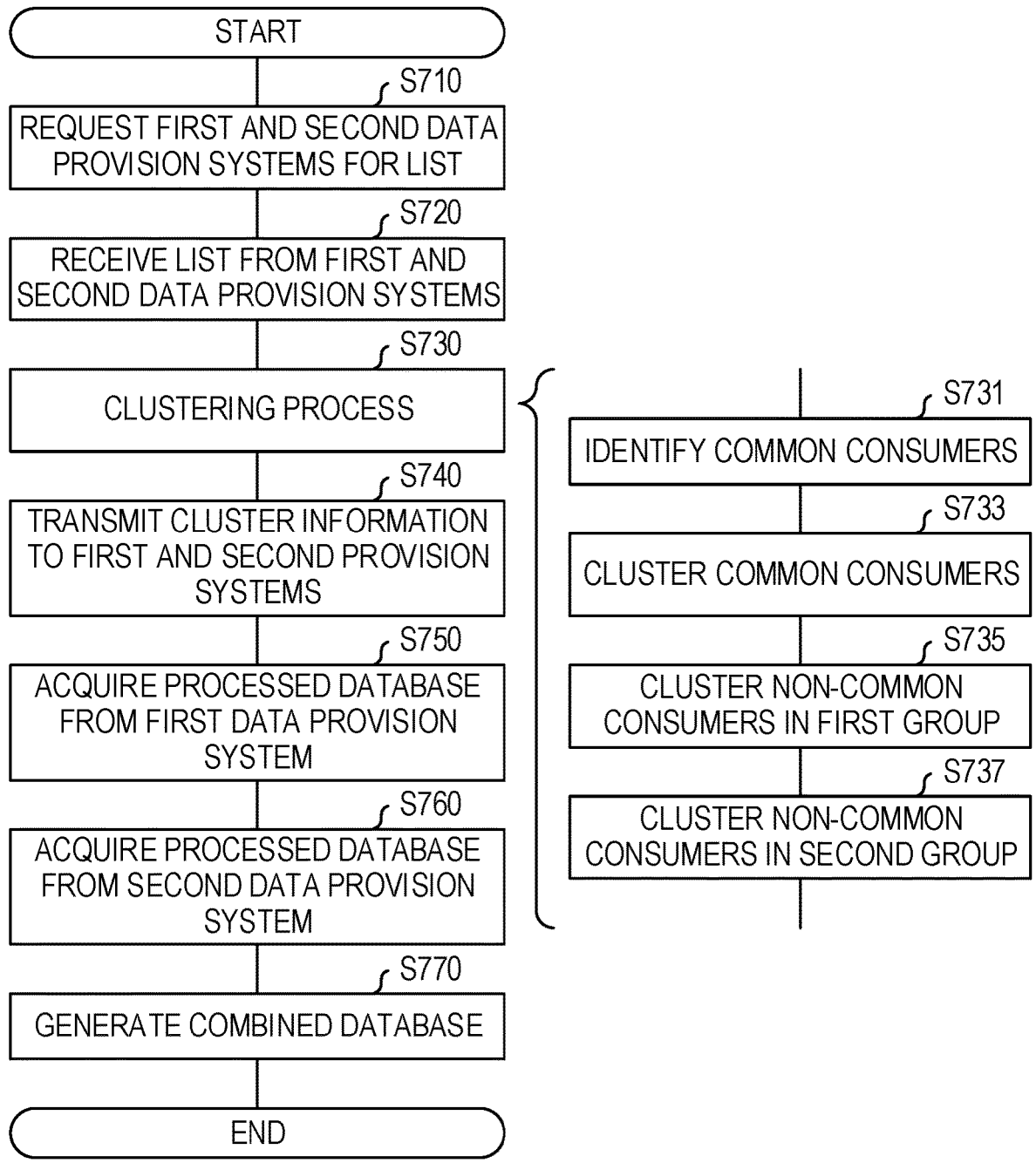
FIG. 28 is a flowchart showing a combination related process performed by the combination system.

The processor 11 of the combination system 10 performs a combination related process illustrated in FIG. 28 upon receiving an instruction to generate the combined database 157 from an operator through the user interface 19.

When the combination related process starts, the processor 11 transmits a request signal for requesting a consumer list, to the first data provision system 30 and the second data provision system 50 via the network NT (S710).

Figure 29:
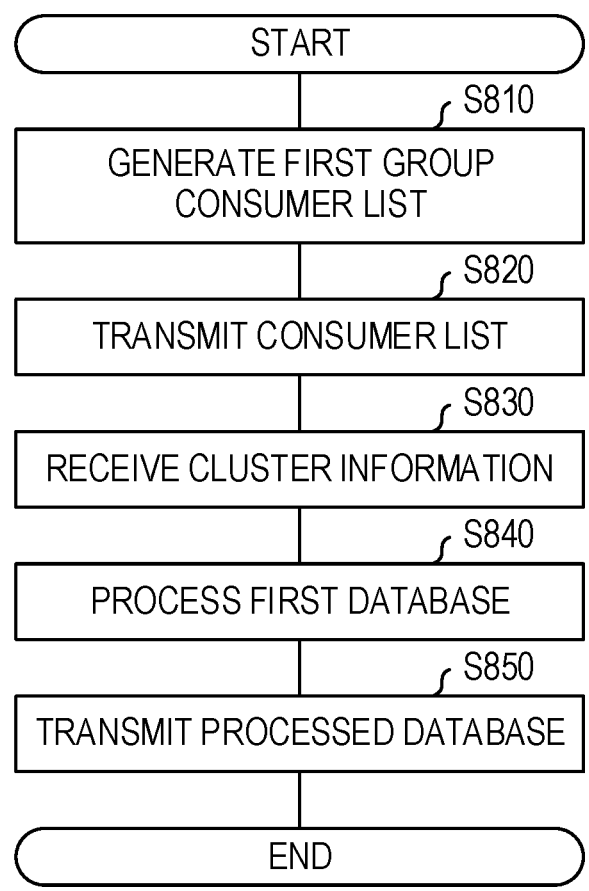
FIG. 29 is a flowchart showing a first data provision process performed by a first data provision system.

Upon receiving this request signal, the processor 31 of the first data provision system 30 starts a first data provision process illustrated in FIG. 29. In the first data provision process, the processor 31 generates a consumer list L71 which is a list of consumers of the first group that have the first individual feature data F71 stored in the first database 352 (S810), and transmits the consumer list L71 thus generated to the combination system 10 via the network NT (S820).

As illustrated in the lower section of FIG. 26, the processor 31 can generate the consumer list L71 that is a list of the identifiers ID_C of consumers in the first group. The consumer list L71 may be generated with the identifiers ID_C hashed. Here, consumers of the first group whose identifiers ID_C are unknown are not listed in the consumer list L71. In the present embodiment, the pieces of feature data of the consumers whose identifiers ID_C are unknown is not used for generating the combined database 157.

Figure 30:
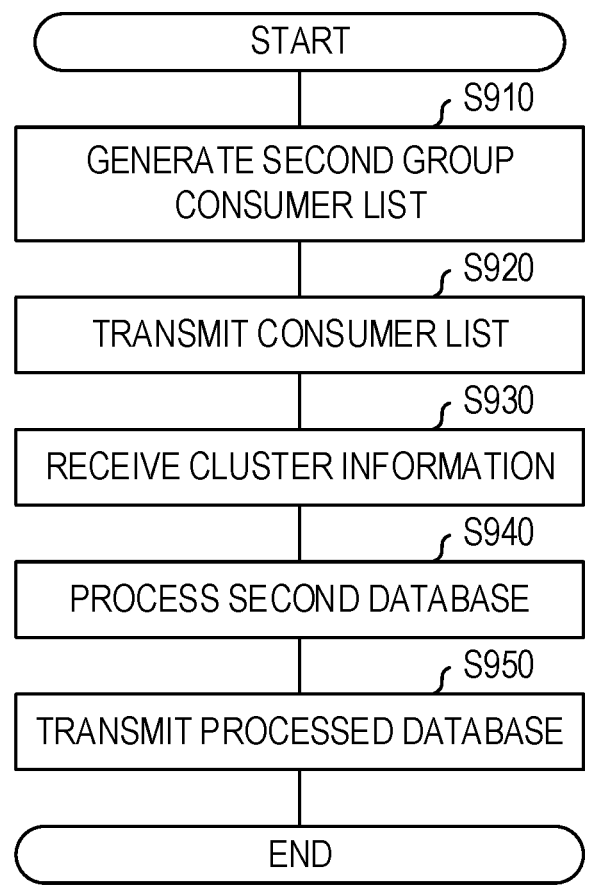
FIG. 30 is a flowchart showing a second data provision process performed by a second data provision system.

Similarly, upon receiving the request signal, the processor 51 of the second data provision system 50 starts a second data provision process illustrated in FIG. 30. In the second data provision process, the processor 51 generates a consumer list L72 which is a list of consumers of the second group that have the second individual feature data F72 stored in the second database 552 (S910), and transmits the consumer list L72 thus generated to the combination system 10 via the network NT (S920).

As illustrated in the lower section of FIG. 27, the processor 51 can generate the consumer list L72 that is a list of the identifiers ID_C of consumers in the second group. The consumer list L72 may be generated with the link identifiers ID_C hashed using the same hash function as the first data provision system 30.

The processor 11 of the combination system 10 receives these consumer lists L71 and L72 (S720), and performs a clustering process (S730) based on the received consumer lists L71, L72.

In the clustering process (S730), the processor 11 identifies common consumers who are consumers common to the first group and the second group, based on the consumer lists L71 and L72 of the first group and the second group (S731). The identification can be implemented by comparing the link identifiers ID_C between the consumer lists L71 and L72.

Then, the processor 11 clusters the common consumers into a plurality of clusters (S733). For example, the processor 11 can cluster the common consumers into a plurality of clusters each having a predetermined number or more of consumers randomly or according to a predetermined rule.

For example, if the number of common consumers is N1 and a predetermined number of consumers per cluster is N2, the number of clusters generated may correspond to a quotient a as a result of dividing the value N1 by the value N2. The value N2 is set to be a value larger than 1 for the sake of personal information protection. When the division results in a remainder $\beta$ that is equal to or larger than 1, one or more consumers corresponding to the remainder $\beta$ may be distributed in any of the clusters the quantity of which corresponds to the quotient a, randomly or based on a predetermined rule.

Furthermore, the processor 11 clusters non-common consumers in the first group into a plurality of clusters (S735). The non-common consumers in the first group are consumers in the first group who are not the common consumers identified from the consumer list L71.

Furthermore, the processor 11 clusters non-common consumers in the second group into a plurality of clusters (S737). The non-common consumers in the second group are consumers in the second group who are not the common consumers identified from the consumer list L72. The clustering in S735 and S737 can be performed in a manner that is the same as that in the clustering in S733.

The processor 11 then generates the first cluster information CD1 and the second cluster information CD2, transmits the first cluster information CD1 to the first data provision system 30, and transmits the second cluster information CD2 to the second data provision system 50 (S740).

Figure 31:
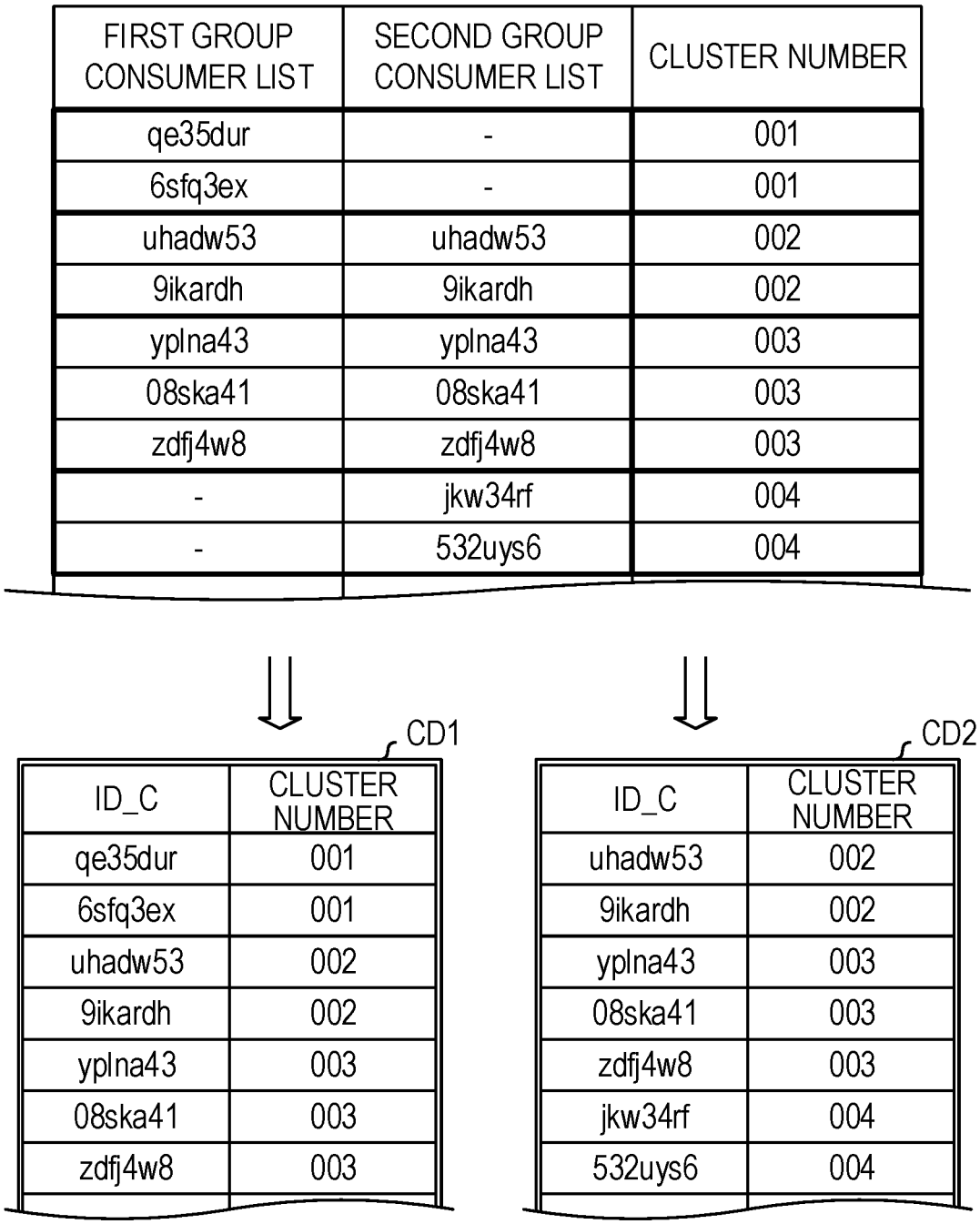
FIG. 31 is a diagram showing a configuration of first cluster information and second cluster information.

As illustrated in FIG. 31, the first cluster information CD1 is generated by attaching to the consumer list L71 received from the first data provision system 30, a cluster number which is an identification code of a cluster to which each consumer belongs. The second cluster information CD2 is generated by attaching to the consumer list L72 received from the second data provision system 50, a cluster number of a cluster to which each consumer belongs.

Figure 32:
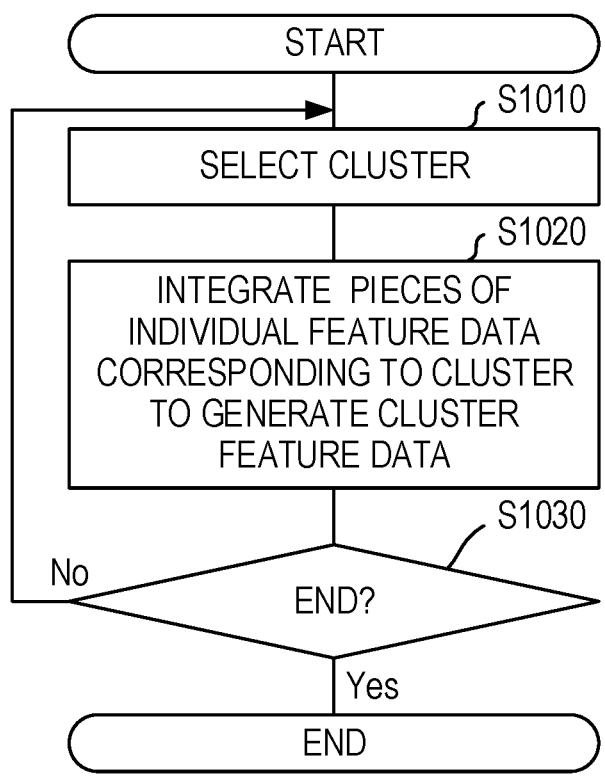
FIG. 32 is a flowchart showing a processing process performed by the first and the second data provision systems.

Upon receiving the first cluster information CD1 (S830), the processor 31 of the first data provision system 30 performs a processing process illustrated in FIG. 32 on the first database 352 in S840.

Specifically, the processor 31 selects one of the clusters based on the received first cluster information CD1 (S1010). The processor 31 integrates pieces of first individual feature data F71 about consumers belonging to the selected cluster through a statistic process, to generate a piece of cluster feature data FC71, which is one piece of feature data corresponding to the selected cluster (S1020).

In S1020, as illustrated in FIG. 33A, the processor 31 converts the values of the parameters X1, X2, and X3 indicated by the pieces of first individual feature data F71 about the consumers belonging to the selected cluster into one statistic ST for each parameter, and generates one piece of cluster feature data FC71 corresponding to this cluster.

The processor 31 repeatedly performs the processes in S1010 and S1020, to generate the piece of cluster feature data FC71 for each of clusters in the first group according to the first cluster information CD1. Then, when the pieces of cluster feature data FC71 for all the clusters are generated (Yes in S1030), the processing process (S840) ends, and the processed database FP71 including the piece of cluster feature data FC71 for each cluster is transmitted to the combination system 10 (S850).

FIG. 33A illustrates a part of the configuration of the processed database FP71. The processed database FP71 is a database having a piece of cluster feature data FC71 corresponding to each of clusters in the first group according to the first cluster information CD1.

According to the example of the first cluster information CD1 illustrated in FIG. 31, the consumers with the consumer numbers A0003 and A0004 belong to the same cluster (cluster number 002). Thus, for this cluster, in S1020, the values of the parameters X1, X2, and X3 indicated by the pieces of first individual feature data F71 about A0003 and A0004 are converted into one statistic ST for each parameter, so that one corresponding piece of cluster feature data FC71 is generated.

As illustrated in FIG. 33A, each piece of cluster feature data FC71 includes information about a cluster number and a cluster size k of the corresponding cluster, together with statistics ST of parameters X1, X2, and X3. The cluster size k represents the number of consumers belonging to the cluster, and is described in the piece of cluster feature data FC71 when the piece of cluster feature data FC71 is generated.

Upon receiving the second cluster information CD2 from the combination system 10, the second data provision system 50 also performs the same process as the first data provision system 30. Specifically, upon receiving the second cluster information CD2 (S930), the processor 51 of the second data provision system 50 performs a processing process illustrated in FIG. 32 on the second database 552 (S940).

In S940, the processor 51 integrates the pieces of second individual feature data F72 included in the second database 552 for each cluster based on the second cluster information CD2, to generate one piece of cluster feature data FC72 for each cluster.

Specifically, the processor 51 can convert the values of parameters Y1, Y2, and Y3 indicated by the pieces of second individual feature data F72 about consumers belonging the corresponding cluster into one statistic ST for each parameter, and generate one piece of corresponding cluster feature data FC72. Then, the processor 51 transmits the processed database FP72 including the piece of cluster feature data FC72 for each cluster to the combination system 10 (S950).

According to the example of the second cluster information CD2 illustrated in FIG. 31, consumers with the consumer numbers B0001 and B0002 belong to the same cluster (cluster number 002). Thus, for this cluster, in S1020, the values of the parameters Y1, Y2, and Y3 indicated by pieces of second individual feature data F72 about B0001 and B0002 are converted into one statistic ST for each parameter, so that one corresponding piece of cluster feature data FC72 is generated.

As illustrated in FIG. 33B, each piece of cluster feature data FC72 includes information about a cluster number and a cluster size k of the corresponding cluster, together with the statistics ST of the parameters Y1, Y2, and Y3.

The processor 11 of the combination system 10 receives the processed database FP71 from the first data provision system 30 (S750), and further receives the processed database FP72 from the second data provision system 50 (S760). Then, the processor 11 combines the processed database FP71 and the processed database FP72 to generate the combined database 157, and stores the combined database 157 in the storage device 15 (S770). Then the process illustrated in FIG. 28 ends.

FIG. 34 schematically illustrates the configuration of the combined database 157. In S770, the processor 11 of the combination system 10 combines the pieces of cluster feature data FC7*l* in the processed database FP71 and the pieces of cluster feature data FC72 in the processed database FP72, with the piece of cluster feature data FC7*l* and the piece of cluster feature data FC72, respectively in the processed database FP71 and the processed database FP72, corresponding to the same cluster are combined. The combined database 157 is generated in this manner.

The processor 11 can determine the piece of cluster feature data FC71 and the piece of cluster feature data FC72 corresponding to the same cluster, based on the cluster number included in each piece of cluster feature data FC71, FC72.

The data processing system 7 according to the present embodiment has been described above. According to the data processing system 7, the combination system 10 can effectively combine the cluster feature data FC71 based on the first database 352 with the cluster feature data FC72 based on the second database 552 to generate the effective combined database 157 with the personal information protected.

Converting individual feature data into cluster feature data is effective in terms of personal information protection. Thus, with this technique, it would be relatively easy to obtain data provision from a database administrator that is reluctant to provide data in terms of personal information protection.

In the present embodiment, the combination system 10 controls the processing of the first database 352 in the first data provision system 30 and the processing of the second database 552 in the second data provision system 50 by providing the first and second cluster information CD1 and CD2. With this control, the piece of cluster feature data FC71 and the piece of cluster feature data FC72 for each common cluster in common consumers can be received from the first data provision system 30 and the second data provision system 50.

Therefore, with the present embodiment, the first database 352 and the second database 552 are processed, and still the effective and valuable combined database 157 can be generated.

Tenth Embodiment

Next, a data processing system 7 according to a tenth embodiment will be described. Hereinafter, description on components of the data processing system 7 according to the tenth embodiment that are the same as those in the ninth embodiment will be omitted as appropriate.

Figure 35:
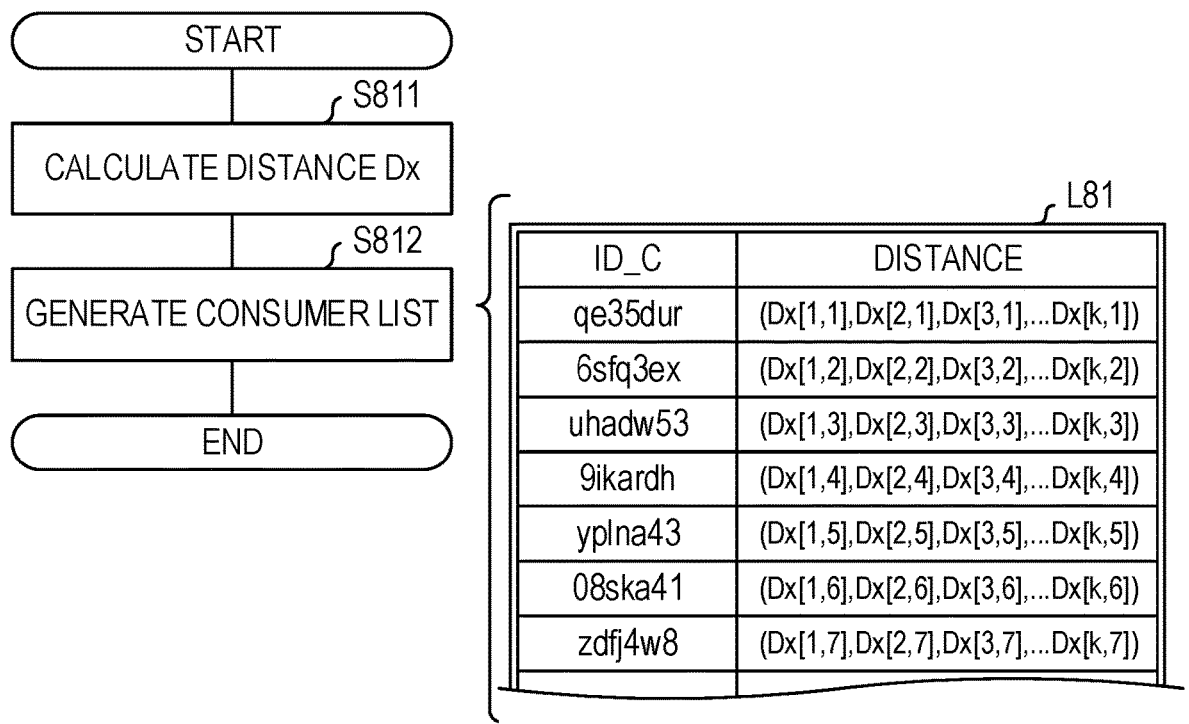
FIG. 35 is a flowchart showing a consumer list generation process performed by a first data provision system according to a tenth embodiment.

In the present embodiment, the processor 31 of the first data provision system 30 performs a consumer list generation process illustrated in FIG. 35, in S810 of the first data provision process (FIG. 29).

Specifically, the processor 31 calculates the distances Dx[i,j] between the consumers in the first group corresponding to the pieces of first individual feature data F71 to which the link identifiers ID_C are attached in the first database 352, as in the fifth embodiment (S811). A distance Dx[i,j] here indicates the distance between the consumer i and the consumer j based on the pieces of first individual feature data F71. In S811, the distances Dx[i,j] can be calculated for all combinations of the consumer i and the consumer j in the corresponding consumers in the first group.

Then, the processor 31 generates a consumer list L81 with distance information (S812), which is a list of identifiers ID_C of the consumers in the first group and has information of the distances Dx[i,j] calculated in S811. According to the example illustrated in FIG. 35, in the consumer list L81, the identification code of the consumer j is associated with the distance Dx[i,j] for each combination with any consumer i. In S820 (FIG. 29), the consumer list L81 with the distance information thus generated is transmitted to the combination system 10.

Figure 36:
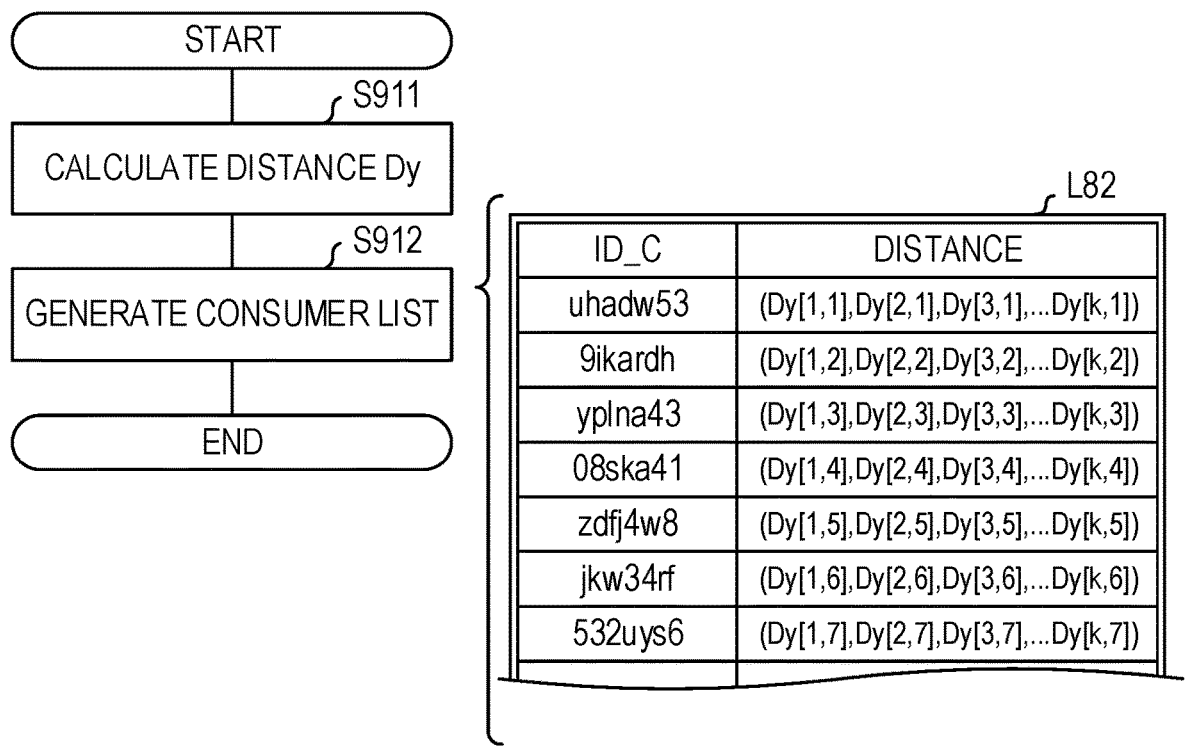
FIG. 36 is a flowchart showing a consumer list generation process performed by a second data provision system according to the tenth embodiment.

Similarly, the processor 51 of the second data provision system 50 performs the process illustrated in FIG. 36, in S910 of the second data provision process (FIG. 30).

Specifically, the processor 51 calculates the distances Dy[i,j] between the consumers in the second group corresponding to the pieces of second individual feature data F72 to which the link identifiers ID_C are attached in the second database 552, as in the fifth embodiment (S911). In S911, the distances Dy[i,j] can be calculated for all combinations of the consumer i and the consumer j in the consumers in the second group.

Then, the processor 51 generates a consumer list L82 with distance information (S912), which is a list of identifiers ID_C of the consumers in the second group and has information of the distances Dy[i,j] calculated in S911. In S920 (FIG. 30), the consumer list L82 with the distance information thus generated is transmitted to the combination system 10.

The processor 11 of the combination system 10 performs the following processes in each of S733, S735, and S737 (see FIG. 28) based on the consumer lists L81 and L82.

Specifically, in S733, the processor 11 calculates distances D between consumers for the common consumers, as the combined distances $D[i, j]=(Dx[i,j]^2+Dy[i,j]^2)^{1/2}$ based on the distances Dx indicated by the consumer list L81 and the distances Dy indicated by the consumer list L82, as in the fifth embodiment.

The processor 11 clusters the common consumers into a plurality of clusters each including a predetermined number of consumers with a short distance D in between, that is, having similar features, based on a distribution of the common consumers on the feature space, identified from the distances D.

Similarly, in S735, the processor 11 calculates the distances D between consumers for non-common consumers in the first group based on the distances Dx[i,j] indicated by the consumer list L81. The non-common consumers in the first group have no information corresponding to the distances Dy[i, j]. Thus, the distances D for the non-common consumers are calculated as in S733 with Dy[i, j] assumed to be 0.

The processor 11 clusters non-common consumers in the first group into a plurality of clusters each including a predetermined number of consumers with a short distance D in between, based on a distribution of non-common consumers in the first group on the feature space, identified from this distances D.

Similarly, in S737, the processor 11 calculates the distances D between consumers for non-common consumers in the second group based on the distances Dy[i,j] indicated by the consumer list L82. The non-common consumers in the second group have no information corresponding to the distances Dx[i, j]. Thus, the distances D for the non-common consumers are calculated as in S733 with Dx[i, j] assumed to be 0.

The processor 11 clusters non-common consumers in the second group into a plurality of clusters each including a predetermined number of consumers with a short distance D in between, based on a distribution of non-common consumers in the second group on the feature space, identified from the distances D.

After performing the above-described process in the clustering process (S730), the processor 11 transmits the first cluster information CD1 and the second cluster information CD2, based on the process results, respectively to the first data provision system 30 and the second data provision system 50 (S740). Then, the processes as in the ninth embodiment are performed.

According to the present embodiment, the combination system 10 clusters the common consumers, the non-common consumers in the first group, and the non-common consumers in the second group, based on the information about the distances D, so that clusters each including consumers with a short distance D in between (that is similar features) are obtained. Thus, the combined database 157 can be generated to be more effective than that obtained in the ninth embodiment through the clustering not taking the distances D into consideration. In other words, the combined database 157 can be generated based on the cluster feature data FC71 and the cluster feature data FC72 that are obtained by integrating pieces of feature data through a statistic process without losing effective consumer information.

As a modification of the tenth embodiment, the distance Dx may be calculated by using some but not all of the parameters X1, X2, . . . of the piece of first individual feature data F71. Similarly, the distance Dy may be calculated by using some but not all of the parameters Y1, Y2, . . . of the piece of second individual feature data F72. Such calculation of the distances Dx and Dy is effective for strengthening the protection of personal information.

Eleventh Embodiment

Next, a data processing system 7 according to an eleventh embodiment will be described. Hereinafter, description on components of the data processing system 7 according to the eleventh embodiment that are the same as those in the ninth embodiment will be omitted as appropriate.

Figure 37:
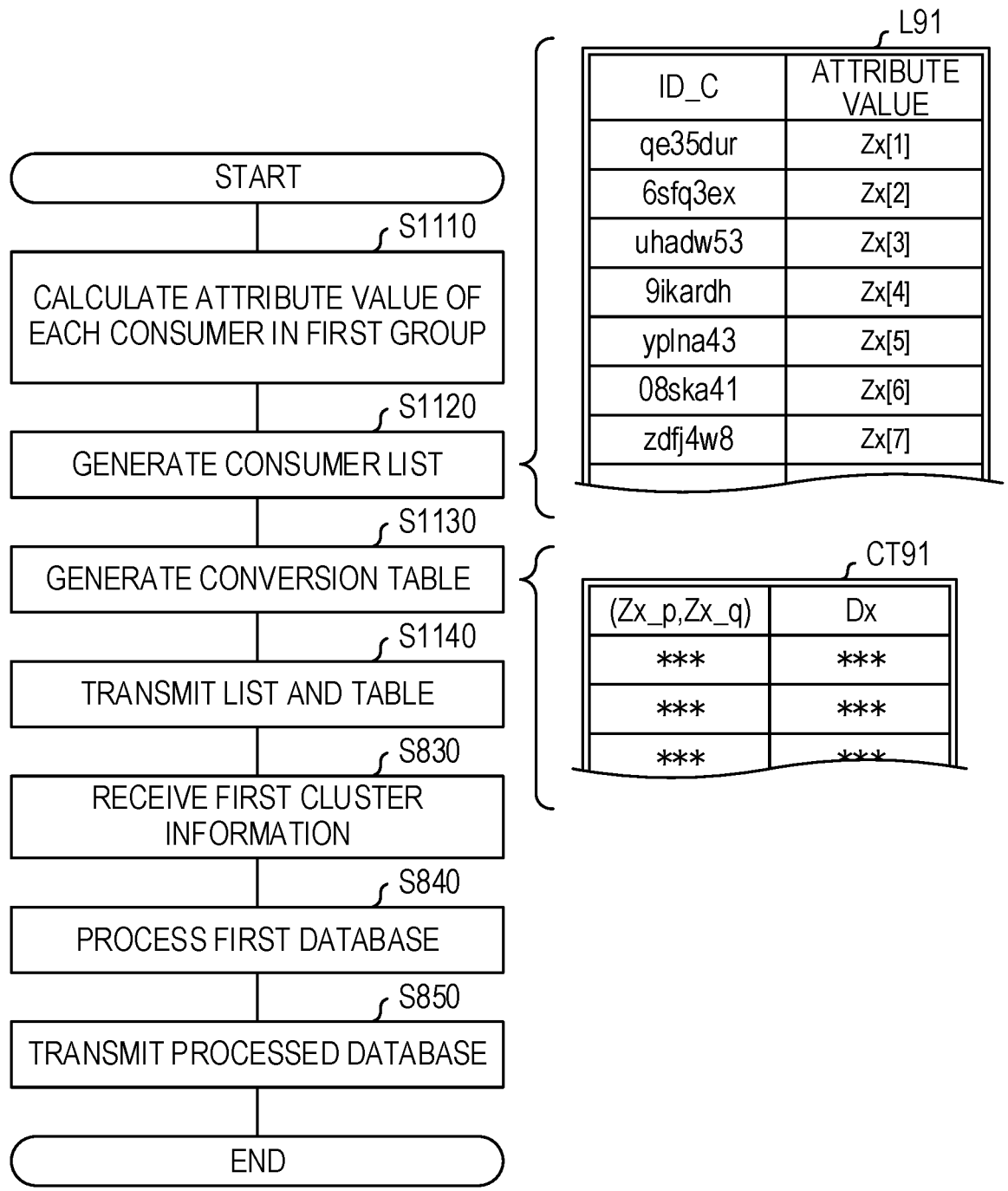
FIG. 37 is a flowchart showing a first data provision process performed by a first data provision system according to an eleventh embodiment.

In the present embodiment, the processor 31 of the first data provision system 30 performs a first data provision process illustrated in FIG. 37, instead of the process illustrated in FIG. 29, upon receiving the request signal related to the consumer list from the combination system 10. In the first data provision process, the processor 31 calculates an attribute value Zx of each consumer in the first group to which the link identifier ID_C is attached in the first database 352 (S1110). In a right section of FIG. 37 and in the following description, Zx[i] indicates the attribute value Zx of the consumer i.

For example, the attribute value Zx[i] of the consumer i is a value obtained by coding a combination of basic attributes (demographic attributes for example) such as the age, gender, residential area, and occupation of the consumer i, into a value corresponding to the combination. For example, the attribute value Zx[i] of the consumer i may be a hash value calculated as a result of inputting a combination of the basic attributes of the consumer i to a hash function.

It should be noted that the attribute value Zx[i] may be a value obtained by hashing only one of the basic attributes of the consumer i. The attribute value Zx[i] may be a value obtained by hashing only the residential area of the consumer i, for example. The hashing is performed in order to keep specific information about the basic attributes of the consumer secret from the outside of the first data provision system 30.

The information about the basic attributes may be extracted from the first individual feature data F71 in the first database 352, or may be obtained from a database that stores information about the consumers in the first group and is different from the first database 352.

In subsequent S1120, the processor 31 generates a consumer list L91 that is a list of identifiers ID_C of consumers in the first group, to which the attribute values Zx calculated in S1110 are attached. In an example illustrated in the right section of FIG. 37, the consumer list L91 is generated with the link identifier ID_C of the consumer i associated with the attribute value Zx[i] related to the consumer i.

Furthermore, the processor 31 generates a conversion table CT91 for converting a combination (Zx_p, Zx_q) of the attribute values Zx into a distance Dx (S1130). As illustrated in the right area of FIG. 37, the conversion table CT91 is a table in which, for each combination (Zx_p, Zx_q) of the attribute values Zx, a distance Dx corresponding to the combination (Zx_p, Zx_q) is described.

With the conversion table CT91, the distance Dx[i,j] between the consumer i and the consumer j can be determined as the distance Dx associated with the combination (Zx_p, Zx_q) in the conversion table CT91 where the value Zx_p is an attribute value Z[i] of the consumer i and a value Zx_q is an attribute value Z[j] of the consumer j. The distance Dx[i,j] between the consumer i and the consumer j can be regarded as a distance between the consumers i and j arranged on the feature space defined by the basic attributes. The shorter distance Dx[i,j] can be regarded as indicating that the consumer i and the consumer j are similar to each other in terms of the basic attributes.

The processor 31 can generate the conversion table CT91 by calculating the distance Dx for each combination (Zx_p, Zx_q) of the attribute values Zx, as a distance between a point on the feature space corresponding to a combination of the basic attributes corresponding to the attribute value Zx_p and a point on the feature space corresponding to a combination of the basic attributes corresponding to the attribute value Zx_q.

The processor 31 transmits the consumer list L91 and the conversion table CT91 thus generated to the combination system 10 (S1140). After that, the processor 31 receives the first cluster information CD1 (S830), generates the processed database FP71 based on the first cluster information CD1 (S840), and transmits the processed database FP71 to the combination system 10 (S850) as in the first embodiment. Then, the first data provision process ends.

Figure 38:
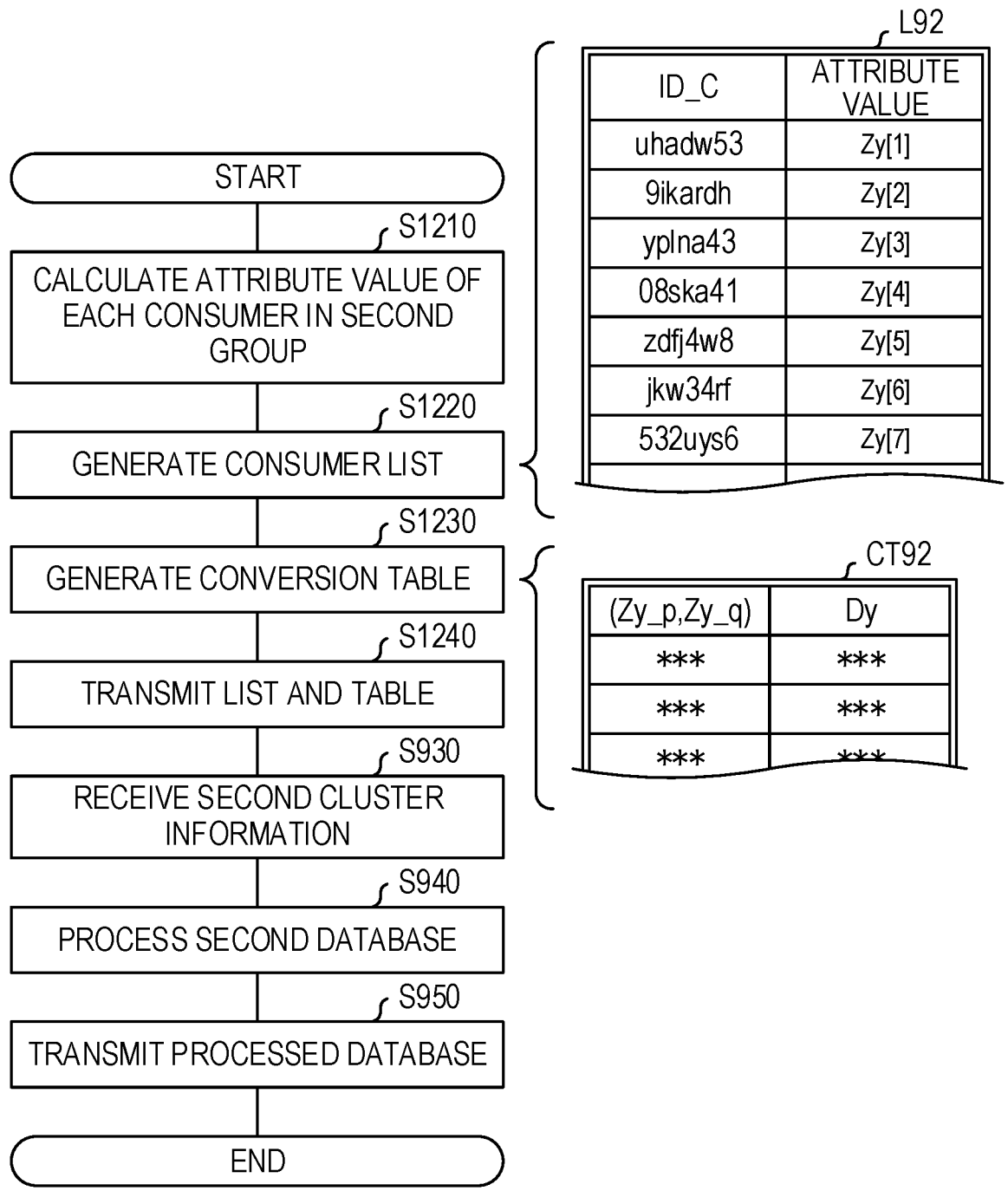
FIG. 38 is a flowchart showing a second data provision process performed by a second data provision system according to the eleventh embodiment.

Similarly, the processor 51 of the second data provision system 50 performs a second data provision process illustrated in FIG. 38, instead of the process illustrated in FIG. 30, upon receiving the request signal related to the consumer list from the combination system 10. In the second data provision process, the processor 51 calculates an attribute value Zy of each consumer in the second group as in S1110 (S1210). In a right section of FIG. 38 and in the following description, Zy[i] indicates the attribute value Zy of the consumer i.

The attribute value Zy[i] of the consumer i is a value obtained by coding a combination of basic attributes of the consumer i, into a value (a hash value for example) corresponding to the combination, as in the case of the attribute value Zx[i] described above. The information about the basic attributes may be extracted from the second individual feature data F72 in the second database 552, or may be obtained from a database that stores information about consumers in the second group and is different from the second database 552.

After the attribute values Zy of the consumers are calculated in S1210, the processor 51 generates a consumer list L92 that is a list of identifiers ID_C of consumers in the second group, to which the attribute values Zy calculated in S1210 are attached (S1220). An example of the consumer list L92 is illustrated in the right section of FIG. 38.

Furthermore, the processor 51 generates a conversion table CT92 for converting a combination (Zy_p, Zy_q) of the attribute values Zy into the distance Dy (S1230). As illustrated in the right area of FIG. 38, the conversion table CT92 is a table in which, for each combination (Zy_p, Zy_q) of the attribute values Zy, a distance Dy corresponding to the combination (Zy_p, Zy_q) is described.

The processor 51 can generate the conversion table CT92 by calculating the distance Dy for each combination (Zy_p, Zy_q) of the attribute values Zy, as a distance between a point on the feature space corresponding to a combination of the basic attributes corresponding to the attribute value Zy_p and a point on the feature space corresponding to a combination of the basic attributes corresponding to the attribute value Zy_q.

The processor 51 transmits the consumer list L92 and the conversion table CT92 thus generated to the combination system 10 (S1240). After that, the processor 51 receives the second cluster information CD2 (S930), generates the processed database FP72 based on the second cluster information CD2 (S940), and transmits the processed database FP72 to the combination system 10 (S950) as in the first embodiment. Then, the second data provision process ends.

Figure 39:
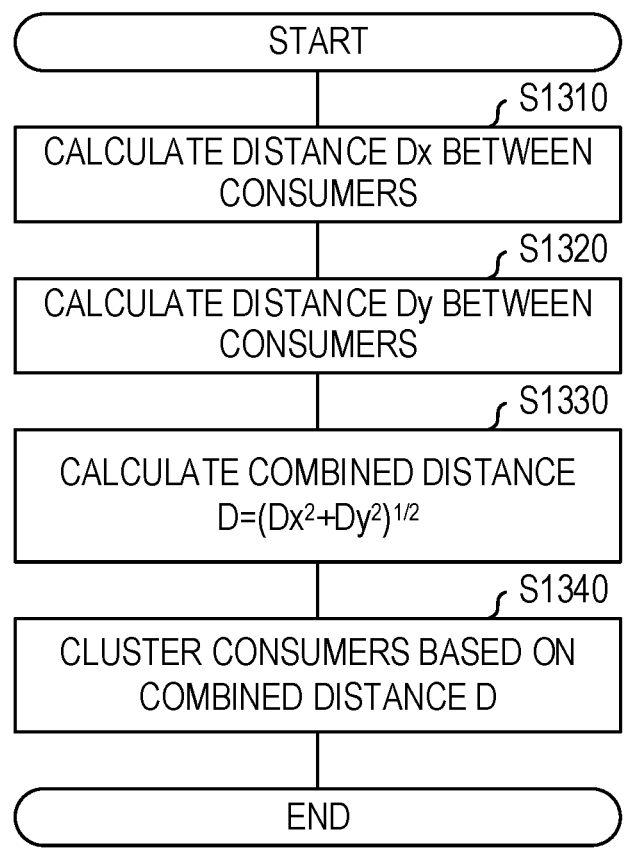
FIG. 39 is a flowchart showing a process performed by a combination system according to the eleventh embodiment.

The processor 11 of the combination system 10 can perform the process illustrated in FIG. 39, in each of S733, S735, and S737 (see FIG. 28) based on the consumer list L91 and the conversion table CT91 received from the first data provision system 30 as well as the consumer list L92 and the conversion table CT92 received from the second data provision system 50.

Specifically, in S733, the processor 11 calculates the distances Dx between common consumers based on the consumer list L91 and the conversion table CT91 (S1310). Furthermore, distances Dy between consumers are calculated based on the consumer list L92 and the conversion table CT92 (S1320). Then, based on the calculated distances Dx and Dy, the distances $D=(Dx^2+Dy^2)^{1/2}$ as the above-described combined distance between consumers are calculated (S1330).

Then, the processor 11 clusters the common consumers into a plurality of clusters each including a predetermined number of consumers with a short distance D in between, that is, having similar features, based on a distribution of the common consumers on the feature space, identified from this distances D (S1340).

Similarly in S735, the processor 11 clusters non-common consumers in the first group into a plurality of clusters each including a predetermined number of consumers with a short distance D in between, through the procedure in FIG. 39. Similarly in S737, non-common consumers in the second group are clustered into a plurality of clusters each including a predetermined number of consumers with a short distance D in between. The distances Dx and Dy that cannot be determined in S735 and S737 are handled as in the tenth embodiment.

The data processing system 7 according to the eleventh embodiment has been described above. In the eleventh embodiment, the clustering is performed based on the distances in the feature space between consumers as in the tenth embodiment, whereby the effective combined database 157 can be generated.

Twelfth Embodiment

Next, a data processing system 7 according to a twelfth embodiment will be described. Hereinafter, description on components of the data processing system 7 according to the twelfth embodiment that are the same as those in the ninth embodiment will be omitted as appropriate.

In the data processing system 7 according to the present embodiment, the combination system 10 stores in the storage device 15, a relationship table 159 indicating a relationship between the consumer numbers ID_A used in the first database 352 and the consumer numbers ID_B used in the second database 552.

Figure 40:
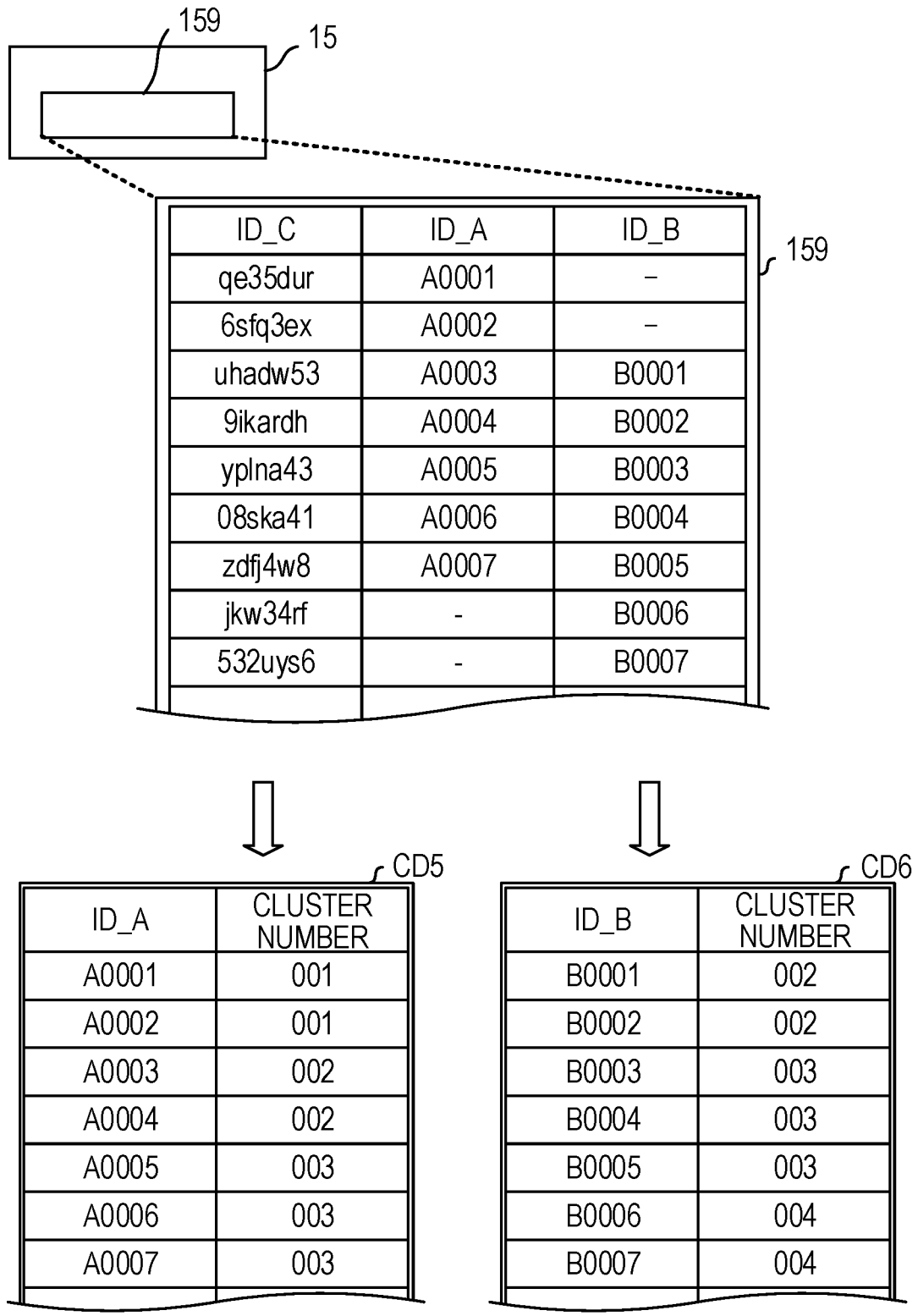
FIG. 40 is an explanatory diagram of a relationship table held by a combination system according to a twelfth embodiment.

As illustrated in the upper section of FIG. 40, the relationship table 159 includes, for each of the common consumers, information with which the consumer number ID_A and the consumer number ID_B of the common consumer are associated with each other. The relationship table 159 illustrated in the upper section of FIG. 40 further includes information about the link identifier ID_C of each consumer. However, this information is optional.

The relationship table 159 may be generated based on information provided in advance by administrators of the first database 352 and the second database 552. The relationship table 159 may be generated based on information provided by another party. For example, a company that tracks user activity on the network, such as web page access, may obtain the consumer numbers ID_A and ID_B provided by a plurality of companies to the same user, through the tracking. The relationship table 159 can be generated based on information available from such companies. The relationship table 159 may be generated based on information acquired by the combination system 10 by tracking user behavior on the network.

Figure 41:
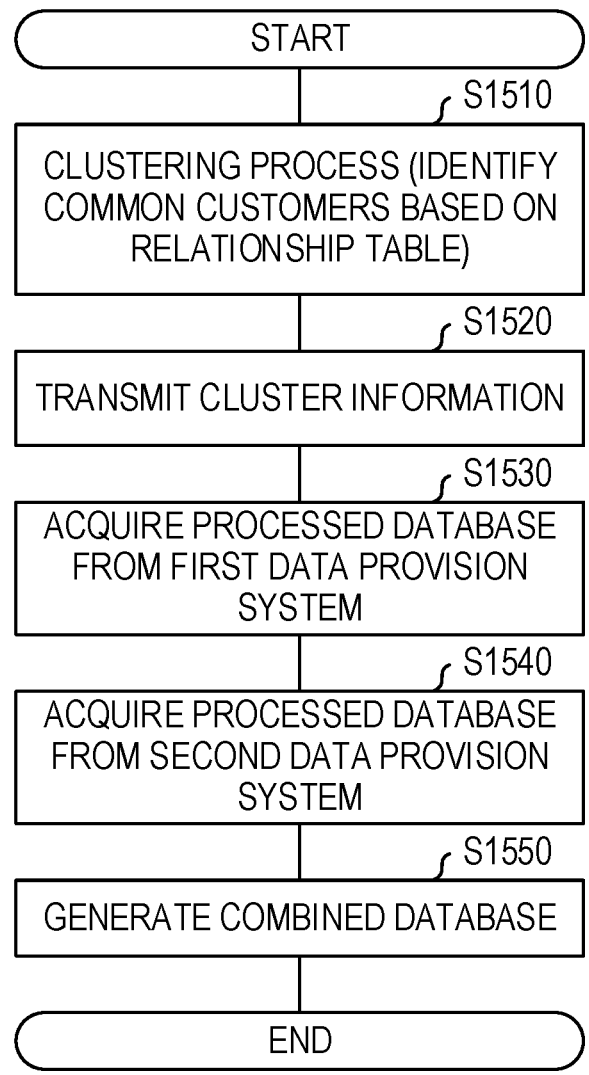
FIG. 41 is a flowchart showing a combination related process performed by the combination system according to the twelfth embodiment.

In the present embodiment, the processor 11 of the combination system 10 performs a combination related process illustrated in FIG. 41 instead of the process illustrated in FIG. 28, based on an instruction from the operator.

In this combination related process, the processor 11 performs clustering process, corresponding to S730, in S1510 without requesting for and receiving the consumer list. In this clustering process, the common consumers are identified with reference to the relationship table 159 (S731), and the common consumers are clustered into a plurality of clusters (S733). Furthermore, non-common consumers in the first group are clustered into a plurality of clusters (S735), and non-common consumers in the second group are clustered into a plurality of clusters (S737).

The processor 11 then generates first cluster information CD5 and second cluster information CD6, transmits the first cluster information CD5 to the first data provision system 30, and transmits the second, cluster information CD6 to the second data provision system 50 in S1520.

As illustrated in the lower left section in FIG. 40, the first cluster information CD5 is generated with the cluster number of the cluster to which each consumer belongs attached to the list of first group of consumers that is a list of consumer numbers ID_A of consumers in the first group. As illustrated in the lower right section in FIG. 40, the second cluster information CD6 is generated with the cluster number of the cluster to which each consumer belongs attached to the list of second group of consumers that is a list of consumer numbers ID_B of consumers in the second group.

Subsequently, in S1530, the processor 11 receives the processed database FP71 from the first data provision system 30, receives the processed database FP72 from the second data provision system 50 (S1540), combines the processed database FP71 and the processed database FP72 to generate the combined database 157, and stores the combined database 157 in the storage device 15 (S1550). Then the process illustrated in FIG. 41 ends.

The processor 31 of the first data provision system 30 that has received the first cluster information CD5 from the combination system 10 (S830) without performing the processes in S810 and S820 illustrated in FIG. 29 can generate and transmit the processed database FP71 based on this first cluster information CD5 (S840, S850).

The processor 51 of the second data provision system 50 that has received the second cluster information CD6 from the combination system 10 (S930) without performing the processes in S910 and S920 illustrated in FIG. 30 can generate and transmit the processed database FP72 based on this second cluster information CD6 (S940, S950).

The data processing system 7 according to the twelfth embodiment has been described above. The data processing system 7 according to the present embodiment provides the same effects as the ninth embodiment.

[Miscellaneous]

It is a matter of course that the present disclosure is not limited to the exemplary embodiments described above, and can be implemented in various modes.

For example, the constituents of the first and second groups are not limited to consumers. One or both of the first and second groups may be at least one set of objects and locations related to human activities, and the constituents of the first and second groups may be the elements of such a set. In recent years, consumer behavior has been closely related to mobile terminals such as smartphones. Therefore, the first databases 151 and 352 and the second databases 351 and 552 may have feature data about each portable terminal corresponding to the consumer.

In the first to fifth embodiments, the combination system 10 acquires the list of second group of consumers from the data provision system 30, to identify common consumers. As another example, the combination system 10 may be configured transmit the list of all the first group of consumers in S130, without performing the process in S120. In this case, in S230, the data provision system 30 can identify the common consumers by comparing the identification codes included in list of all the first group of consumers with the identification codes of the second group of consumers.

The link identifier ID_C according to the ninth embodiment does not have to be assigned to the consumer in advance. The link identifier ID_C may be generated by coding detailed personal information of each consumer held by the administrator of the first database 352 and the second database 552. The data provision systems 30 and 50 may have a function of storing such personal information and encoding the personal information to generate the link identifier ID_C. Examples of this personal information include information such as a name, address, telephone number, and e-mail address. A hash function may be used for the coding.

Thus, the link identifier ID_C may be a hash value generated by inputting personal information to the hash function. If the link identifier ID_C is generated by coding personal information with a hash function common in the first database 352 and the second database 552, any one of the feature data of the first database 352 and the feature data of the second database 552, for the same person, can be associated with the same link identifier ID_C.

When an irreversible hash value is used for the link identifier ID_C, leakage of personal information to the outside would basically not occur. The personal information to be converted into the hash value is not limited to the above-described specific example as long as the link identifier ID_C is information unique to each individual. Instead of the link identifier ID_C, a part of the personal information not coded may be provided to the combination system together with the consumer numbers ID_A and ID_B, for identifying the common consumer.

The concept of employing a hash value as the link identifier ID_C is also applicable to the identification codes of the first group and the second group exchanged between the combination system 10 and the data provision systems 30 and 50 in the first to the eighth embodiments. Thus, the identification codes of the first group and the second group may be transmitted and received as hash values.

In addition, in the ninth to twelfth embodiments, a plurality of consumers common to the first group and the second group are clustered into a plurality of clusters. Alternatively, the combined database 157 may be generated based on a result of clustering, into a plurality of clusters, a plurality of pairs each being a pair of a consumer in the first group and a consumer in the second group corresponding to each other. The pair may be a pair of two consumers that at least partially correspond to each other. For example, a pair of consumers that at least correspond to each other may be a pair of consumers that are estimated to be the same entity or likely to be the same entity.

For example, in the twelfth embodiment, the relationship table 159 includes the information with which the consumer numbers ID_A and the consumer numbers ID_B of the common consumers are associated with each other. Alternatively, the relationship table 159 may indicate a pair of a consumer in the first group and a consumer in the second group that at least partially correspond to each other, based on the association between the consumer number ID_A and the consumer number ID_B. For example, the relationship table 159 may be a table indicating a pair of a consumer in the first group and a consumer in the second group estimated to be the same person, based on the association between the consumer number ID_A and the consumer number ID_B.

Such a relationship table 159 can be generated by, for example, checking a cookie list. By tracking consumer behavior on the network, a cookie list associated with the consumer number ID_A and a cookie list associated with the consumer number ID_B can be generated. If the matching level between the cookie list associated with the consumer number ID_A and the cookie list associated with the consumer number ID_B is high, it can be regarded that the consumer in the first group corresponding to the consumer number ID_A and the consumer in the second group corresponding to the consumer number ID_B is likely to be the same consumer.

Thus, with the consumer in the first group and the consumer in the second group with the matching level of the cookie lists being equal to or higher than a reference level estimated to be the same person, a table indicating a pair of the consumer in the first group and the consumer in the second group estimated to be the same person based on the association between the consumer number ID_A and the consumer number ID_B can be generated as the relationship table 159.

The techniques according the tenth and eleventh embodiments for performing clustering based on the distance information are also applicable to the data processing system 7 using the relationship table 159. In such a case, from the first data provision system 30 to the combination system 10, the consumer list with each consumer indicated by the consumer number ID_A instead of the link identifier ID_C can be transmitted as the consumer list replacing the consumer lists L81 and L91 illustrated in FIG. 35 and FIG. 37. Similarly, from the second data provision system 50 to the combination system 10, the consumer list with each consumer indicated by the consumer number ID_B can be transmitted as the consumer list replacing the consumer lists L82 and L92 illustrated in FIG. 36 and FIG. 38.

Furthermore, it is a matter of course that the technique of processing and combining two databases can be applied to the technique of processing and combining three or more databases. Thus, the present disclosure may be utilized for the purpose of processing and combining three or more databases. In this case, a plurality of databases may be combined around one database, or a plurality of databases may be combined in series.

Furthermore, the combined database 157 may be configured as a database having reference information to the processed database FP71 and the processed database FP72. Thus, the combined database 157 may not have the entities of the cluster feature data FC71 and the cluster feature data FC72. The combined data for each cluster may be configured to include link information or address information to the cluster feature data FC71 and the cluster feature data FC72 in the processed database FP71 and the processed database FP72. Thus, combining a plurality of pieces of data includes at least one of combining a plurality of pieces of data into one piece of data and generating information for enabling a plurality of pieces of data to be cross-referenced.

In addition, the clustering based on the combined distance D may be replaced with clustering based on only one of the distance Dx and the distance Dy. This replacement is equivalent to calculating the combined distance D with one of the distances Dx and Dy regarded as a zero value. The fifth embodiment in which the clustering is performed using the distances Dx and Dy may be modified to an embodiment in which clustering is performed using the attribute values Zx and Zy, as in the eleventh embodiment.

In addition, the function of one component in the above-described embodiments may be distributed to a plurality of components. Functions of a plurality of components may be integrated into one component. A part of the configuration of the above embodiments may be omitted. At least a part of the configuration in one of the above embodiments may be added or replaced with the configuration of another one of the above embodiments. Any embodiments included in the technical idea specified from the language of the claims correspond to the embodiments of the present disclosure.

The invention claimed is:

1. An information processing system comprising:
a processor; and
a memory that stores instructions to cause the processor to perform combination processing,
the combination processing, comprising:
acquiring pieces of first feature data related to a first group including first constituents;
acquiring pieces of second feature data related to a second group including second constituents; and
combining data, wherein
each of the pieces of first feature data is associated with first identification information related to a corresponding one or more of the first constituents, and indicates a feature of the corresponding one or more of the first constituents,
each of the pieces of second feature data corresponds to one of clusters in the second group, the clusters each including two or more of the second constituents,
each of the pieces of second feature data includes statistical data associated with second identification information related to two or more of the second constituents included in a corresponding cluster, the statistical data indicating, by statistics of parameters, features of the two or more of the second constituents, the parameters indicating different types of features from each other, each statistic being calculated by integrating, through statistical processing, values of the two or more of the second constituents related to a corresponding parameter, each statistic describing a feature of the corresponding cluster without describing an individual feature of the two or more of the second constituents included in the corresponding cluster, and
the combining comprises combining the pieces of first feature data and the pieces of second feature data, with each of the pieces of first feature data combined with the statistical data about a corresponding two or more of the second constituents, based on the first identification information and the second identification information.

2. The information processing system according to claim 1, wherein the combination processing further comprising clustering pairs of constituents each being a pair of one first constituent in the first group and one second constituent in the second group that correspond to each other into a plurality of clusters, and generating cluster information indicating a cluster to which each of the pairs of constituents belongs, wherein
the acquiring the pieces of second feature data comprises transmitting the cluster information to the data provision system, and acquiring the pieces of second feature data corresponding to the clusters based on the cluster information from the data provision system.

3. The information processing system according to claim 2, wherein
the acquiring the pieces of first feature data comprises transmitting the cluster information to a first data provision system, and acquiring the pieces of first feature data corresponding to the clusters based on the cluster information from the first data provision system,
acquiring the pieces of second feature data comprises transmitting the cluster information to a second data provision system as the data provision system, and acquiring the pieces of second feature data corresponding to the clusters based on the cluster information from the second data provision system, and the pieces of first feature data each have a statistic indicating a feature of two or more of the first constituents included in a corresponding one of the clusters.

4. The information processing system according to claim 2, wherein the combination processing comprises acquiring pieces of individual feature data corresponding to the first constituents, the pieces of individual feature data each indicating a feature of a corresponding one of the first constituents, and for each of the clusters and based on the cluster information, integrating pieces of individual feature data of two or more of the first constituents included in a corresponding cluster through a statistic process, to generate a piece of cluster feature data with a statistic indicating a feature of the two or more of the first constituents for the corresponding cluster, wherein
the acquiring the pieces of first feature data comprises acquiring pieces of cluster feature data each generated for a corresponding one of the clusters, as the pieces of first feature data.

5. A system comprising:
an information processing system according to claim 1; and
a data provision system,
the data provision system comprising:
a processor; and
a memory that stores instructions to cause the processor to perform transmitting processing, the memory further storing pieces of individual feature data corresponding to the second constituents and each indicating a feature of a corresponding one of the second constituents, wherein
the transmitting processing comprises:
generating the statistical data, for each of the clusters in the second group, by converting features of two or more of the second constituents included in a corresponding cluster and indicated by pieces of individual feature data of the two or more of the second constituents into a statistic, and
transmitting the pieces of second feature data corresponding to the clusters to the information processing system.

6. An information processing method performed by a computer, the method comprising:
acquiring pieces of first feature data related to a first group including first constituents;
acquiring pieces of second feature data related to a second group including second constituents; and
combining the pieces of first feature data acquired with the pieces of second feature data acquired, wherein
each of the pieces of first feature data is associated with first identification information related to a corresponding one or more of the first constituents, and indicates a feature of the corresponding one or more of the first constituents,
each of the pieces of second feature data corresponds to one of clusters in the second group, the clusters each including two or more of the second constituents,
each of the pieces of second feature data includes statistical data associated with second identification information related to two or more of the second constituents included in a corresponding cluster, the statistical data indicating, by statistics of parameters, features of the two or more of the second constituents, the parameters indicating different types of features from each other, each statistic being calculated by integrating, through statistical processing, values of the two or more of the second constituents related to a corresponding parameter, each statistic describing a feature of the corresponding cluster without describing an individual feature of the two or more of the second constituents included in the corresponding cluster, and the combining includes combining the pieces of first feature data and the pieces of second feature data, with each of the pieces of first feature data combined with the statistical data about a corresponding two or more of the second constituents, based on the first identification information and the second identification information.

7. The information processing method according to claim 6, wherein to each of the first constituents, respective first unique identification codes are assigned, to each of the second constituents, respective second unique identification codes are assigned, the first identification information includes one or more first unique identification codes assigned to the corresponding one or more of the first constituents, the second identification information includes second unique identification codes assigned to the two or more of the second constituents, and the combining comprising combining, based on association between the first unique identification codes of the first constituents and the second unique identification codes of the second constituents, each of the pieces of first feature data with a piece of second feature data associated with a corresponding one of the second unique identification codes.

8. The information processing method according to claim 6, wherein to each of the first constituents, respective first unique identification codes are assigned, to each of the second constituents, respective second unique identification codes are assigned, the second identification information includes a unique identification code of the corresponding cluster, and the combining comprising combining the pieces of first feature data and the pieces of second feature data based on information indicating, for each of the clusters, second unique identification codes assigned to two or more of the second constituents included in a corresponding cluster and/or first unique identification codes corresponding to the second unique identification codes in association with the unique identification code of the corresponding cluster.

9. The information processing method according to claim 6, wherein each of the pieces of first feature data corresponds to one of clusters in the first group, and the clusters in the first group each include two or more of the first constituents, and each of the pieces of first feature data includes statistical data with a statistic indicating a feature of two or more of the first constituents included in a corresponding one of the clusters.

10. The information processing method according to claim 6, wherein the acquiring the pieces of second feature data comprises transmitting cluster information defining the clusters in the second group to a data provision system, and acquiring the pieces of second feature data corresponding to the clusters from the data provision system.

11. The information processing method according to claim 6, wherein the second constituents include a plurality of corresponding constituents corresponding to any of the first constituents, the information processing method further comprises clustering the corresponding constituents into a plurality of clusters based on the pieces of first feature data, and generating cluster information indicating a cluster to which each of the corresponding constituents belongs, and the acquiring the pieces of second feature data comprises transmitting the cluster information to the data provision system, and acquiring the pieces of second feature data for the clusters based on the cluster information, from the data provision system.

12. The information processing method according to claim 6, further comprising clustering pairs of constituents each being a pair of one first constituent in the first group and one second constituent in the second group that correspond to each other into a plurality of clusters, and generating cluster information indicating a cluster to which each of the pairs of constituents belongs, wherein the acquiring the pieces of second feature data comprises transmitting the cluster information to the data provision system, and acquiring the pieces of second feature data corresponding to the clusters based on the cluster information from the data provision system.

13. The information processing method according to claim 12, wherein the acquiring the pieces of first feature data comprises transmitting the cluster information to a first data provision system and acquiring the pieces of first feature data corresponding to the clusters based on the cluster information from the first data provision system, the acquiring the pieces of second feature data comprises transmitting the cluster information to a second data provision system as the data provision system, and acquiring the pieces of second feature data corresponding to the clusters based on the cluster information from the second data provision system, and the pieces of first feature data each have a statistic indicating a feature of two or more of the first constituents included in a corresponding one of the clusters.

14. The information processing method according to claim 12, further comprising:

acquiring pieces of individual feature data corresponding to the first constituents, the pieces of individual feature data each indicating a feature of a corresponding one of the first constituents, and for each of the clusters and based on the cluster information, integrating pieces of individual feature data of two or more of the first constituents included in a corresponding cluster through a statistic process, to generate a piece of cluster feature data with a statistic indicating a feature of the two or more of the first constituents for the corresponding cluster, wherein the acquiring the pieces of first feature data comprises acquiring pieces of cluster feature data each generated for a corresponding one of the clusters, as the pieces of first feature data.

15. The information processing method according to claim 12, wherein the generating the cluster information comprises acquiring similarity information about at least one of a similarity between the first constituents and a similarity between the second constituents, and clustering the pairs of constituents into a plurality of clusters based on the similarity information acquired.

16. The information processing method according to claim 12, wherein the generating the cluster information comprises acquiring at least one of first attribute information indicating a first attribute value of each of the first constituents and second attribute information indicating a second attribute value of each of the second constituents, determining at least one of a similarity between the first constituents and a similarity between the second constituents based on the at least one of the first attribute information and the second attribute information acquired, and clustering the pairs of constituents into a plurality of clusters based on the similarity determined.

17. The information processing method according to claim 6, wherein the acquiring the pieces of second feature data comprises requesting a data provision system to cluster the second constituents into a plurality of clusters based on a designated constraint condition, and acquiring the pieces of second feature data corresponding to the clusters based on the constraint condition from the data provision system.

18. The information processing method according to claim 6, wherein
the second constituents include a plurality of corresponding constituents each corresponding to any one of the first constituents and a plurality of non-corresponding constituents corresponding to none of the first constituents,
the pieces of second feature data acquired each correspond to one of clusters defined by clustering the corresponding constituents in the second group, and
the acquiring the pieces of second feature data comprises transmitting one of a list of the first constituents and a list of the corresponding constituents to a data provision system, and acquiring the pieces of second feature data from the data provision system.

19. The information processing method according to claim 18, wherein the acquiring the pieces of second feature data comprises transmitting distance information indicating distances between the constituents in the list on a feature space to the data provision system, to request the data provision system to cluster the corresponding constituents in the second group into a plurality of clusters based on the distance information.

20. The information processing method according to claim 18, wherein the acquiring the pieces of second feature data comprises transmitting classification information indicating a classification of each of the constituents in the list to the data provision system, to request the data provision system to cluster the corresponding constituents in the second group into a plurality of clusters based on the classification information so that each of the clusters does not include constituents that are different from each other in the classification.

* * * * *